(12) United States Patent
Ko et al.

(10) Patent No.: US 10,897,355 B2
(45) Date of Patent: Jan. 19, 2021

(54) ELECTRONIC DEVICE AND METHOD FOR OPERATING THE SAME

(71) Applicant: Samsung Electronics Co., Ltd., Gyeonggi-do (KR)

(72) Inventors: Kwangwon Ko, Seoul (KR); Donghyun Roh, Gyeonggi-do (KR); Kyungsub Min, Gyeonggi-do (KR)

(73) Assignee: Samsung Electronics Co., Ltd

( * ) Notice: Subject to any disclaimer, the term of this patent is extended or adjusted under 35 U.S.C. 154(b) by 111 days.

(21) Appl. No.: 15/718,922

(22) Filed: Sep. 28, 2017

(65) Prior Publication Data

US 2018/0123783 A1    May 3, 2018

(30) Foreign Application Priority Data

Oct. 27, 2016    (KR) .......................... 10-2016-0140753

(51) Int. Cl.
*H04L 9/32* (2006.01)
*H04L 9/08* (2006.01)
*G06F 21/00* (2013.01)

(52) U.S. Cl.
CPC .......... *H04L 9/0872* (2013.01); *H04L 9/0894* (2013.01); *H04L 9/3226* (2013.01); *H04L 2209/80* (2013.01)

(58) Field of Classification Search
CPC . H04L 63/0428; H04L 63/061; H04L 63/068; H04L 9/0819; H04L 9/12; H04L 2209/80; H04L 9/0872; H04L 9/0894; H04L 9/3226; H04M 1/725; H04M 2201/34; H04M 2201/36; H04M 2250/06

USPC .............. 726/6; 380/255; 713/171, 183, 185
See application file for complete search history.

(56) References Cited

U.S. PATENT DOCUMENTS

| | | | |
|---|---|---|---|
| 2007/0019609 | A1 | 1/2007 | Anjum |
| 2007/0189321 | A1* | 8/2007 | Lee ........................ H04L 12/282 370/445 |
| 2007/0283157 | A1 | 12/2007 | Yami et al. |
| 2007/0293197 | A1 | 12/2007 | Ekberg et al. |
| 2008/0168544 | A1* | 7/2008 | Von Krogh ........... G06F 21/445 726/6 |
| 2009/0104888 | A1* | 4/2009 | Cox ........................ G06Q 20/40 455/410 |

(Continued)

FOREIGN PATENT DOCUMENTS

| | | |
|---|---|---|
| CN | 105617615 | 6/2016 |
| EP | 3026589 | 6/2016 |

(Continued)

OTHER PUBLICATIONS

International Search Report dated Dec. 1, 2017 issued in counterpart application No. PCT/KR2017/009202, 4 pages.

(Continued)

*Primary Examiner* — Gary S Gracia
(74) *Attorney, Agent, or Firm* — The Farrell Law Firm, P.C.

(57) ABSTRACT

Disclosed is an electronic device and a method thereof, in which user identification information is not exposed because data transmission and reception are performed by using temporary identification that distinguishes one user from another user, instead of by using user identification information of an electronic device.

18 Claims, 16 Drawing Sheets

(56) References Cited

U.S. PATENT DOCUMENTS

| | | | |
|---|---|---|---|
| 2009/0222896 A1* | 9/2009 | Ichikawa | G06F 9/4416 |
| | | | 726/6 |
| 2010/0042847 A1* | 2/2010 | Jung | G06F 21/43 |
| | | | 713/183 |
| 2012/0042365 A1* | 2/2012 | Shoval | G06F 21/567 |
| | | | 726/7 |
| 2013/0102335 A1 | 4/2013 | Katagi et al. | |
| 2013/0263228 A1* | 10/2013 | Tsubaki | H04L 63/107 |
| | | | 726/4 |
| 2013/0291100 A1 | 10/2013 | Ganapathy et al. | |
| 2014/0105394 A1* | 4/2014 | Abildgren | G06F 21/606 |
| | | | 380/255 |
| 2014/0109211 A1* | 4/2014 | Suzuki | H04L 63/0838 |
| | | | 726/7 |
| 2014/0365780 A1* | 12/2014 | Movassaghi | H04L 63/0838 |
| | | | 713/184 |
| 2015/0188918 A1 | 7/2015 | Singaravelu | |
| 2015/0189505 A1* | 7/2015 | Marien | H04W 12/06 |
| | | | 380/270 |
| 2015/0212770 A1* | 7/2015 | Song | G06F 3/1238 |
| | | | 358/1.15 |
| 2016/0144236 A1 | 5/2016 | Ko et al. | |
| 2016/0277443 A1* | 9/2016 | Anantharaju | G06F 21/41 |

FOREIGN PATENT DOCUMENTS

| | | |
|---|---|---|
| KR | 1020100021818 | 2/2010 |
| KR | 101617875 | 4/2016 |

OTHER PUBLICATIONS

European Search Report dated Sep. 13, 2019 issued in counterpart application No. 17865565.0-1218, 7 pages.

* cited by examiner

ELECTRONIC DEVICE AND METHOD FOR OPERATING THE SAME

PRIORITY

This application claims priority under 35 U.S.C. § 119(a) to a Korean Patent Application filed in the Korean Intellectual Property Office on Oct. 27, 2016 and assigned Serial Number 10-2016-0140753, contents of which are incorporated herein by reference.

BACKGROUND

1. Field of the Disclosure

The present disclosure relates generally to an electronic device and a method for operating the electronic device and, more particularly, to a technology for sharing temporary identification information between an electronic device and an external electronic device.

2. Description of the Related Art

As use of various electronic devices such as a smartphone, tablet personal computer (PC), portable multimedia player (PMP), personal digital assistant (PDA), laptop PC, and wearable device has proliferated, peripheral devices synchronizing with various electronic devices have become more popular.

In addition, the Internet of Things (IoT) technology is applied to various peripheral devices in response to the increasing interest in IoT, thereby causing various electronic devices for collecting and transmitting various data through communication means to be developed. In particular, IoT technology can be applied to a healthcare electronic device for determining a user's health state and to an electronic device usable by a plurality of users.

If peripheral devices applied with IoT technology are synchronized with a user's electronic device, information collected by the peripheral devices can be transmitted to the user's electronic device, or information stored in the user's electronic device can be used by the peripheral devices.

Each of a plurality of users of an external electronic device may have to obtain authentication. While performing user authentication, personal information of a user, such as identification and a password, can be exposed to the outside.

If data collected by an external electronic device usable by a plurality of persons does not follow an encryption process when transmitting to a server or an electronic device of a user who uses the external electronic device, the data being transmitted can be accessed from the outside, leaving a user vulnerable to a malicious third party who may be collecting the personal information or user data.

Personal information of a user input in an external electronic device can be temporarily stored in the external electronic device, but the malicious third party can extract the personal information or user data stored in the external electronic device by hacking the external electronic device.

As such, there is a need in the art for a more secure method and apparatus for protecting user authentication information from exposure to the outside in electronic devices.

SUMMARY

The present disclosure has been made to address the above-mentioned shortcomings in the art and to provide the advantages described below.

Accordingly, an aspect of the present disclosure is to provide a method to prevent user identification information or data from being exposed while an electronic device is used by a plurality of users.

According to an aspect of the present disclosure, an electronic device may include a communication module and a processor configured to receive, through the communication module, key information of an external electronic device from the external electronic device processing at least one item of user data of the electronic device, to generate temporary identification information based on at least one of the received key information of the external electronic device and key information of the electronic device, and to transmit the generated temporary identification information to the external electronic device through the communication module.

According to another aspect of the present disclosure, an electronic device may include a communication module, at least one sensor configured to collect data, and a processor configured to transmit key information of the electronic device to an external electronic device through the communication module, to receive temporary identification information from the external electronic device through the communication module, and to transmit data obtained by the at least one sensor to a server through the communication module by using the received temporary identification information.

According to another aspect of the present disclosure, an electronic device may include a communication module and a processor configured to transmit key information of the electronic device to an external electronic device through the communication module, to receive temporary identification information from the external electronic device through the communication module, and to receive at least one item of user data of the electronic device from a server by using the received temporary identification information.

A method for operating an electronic device according to an embodiment of the present disclosure may include receiving key information of an external electronic device from the external electronic device processing at least one item of user data of the electronic device, generating temporary identification information based on at least one of the received key information of the external electronic device and key information of the electronic device, and transmitting the temporary identification information to the external electronic device.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Figure 1:
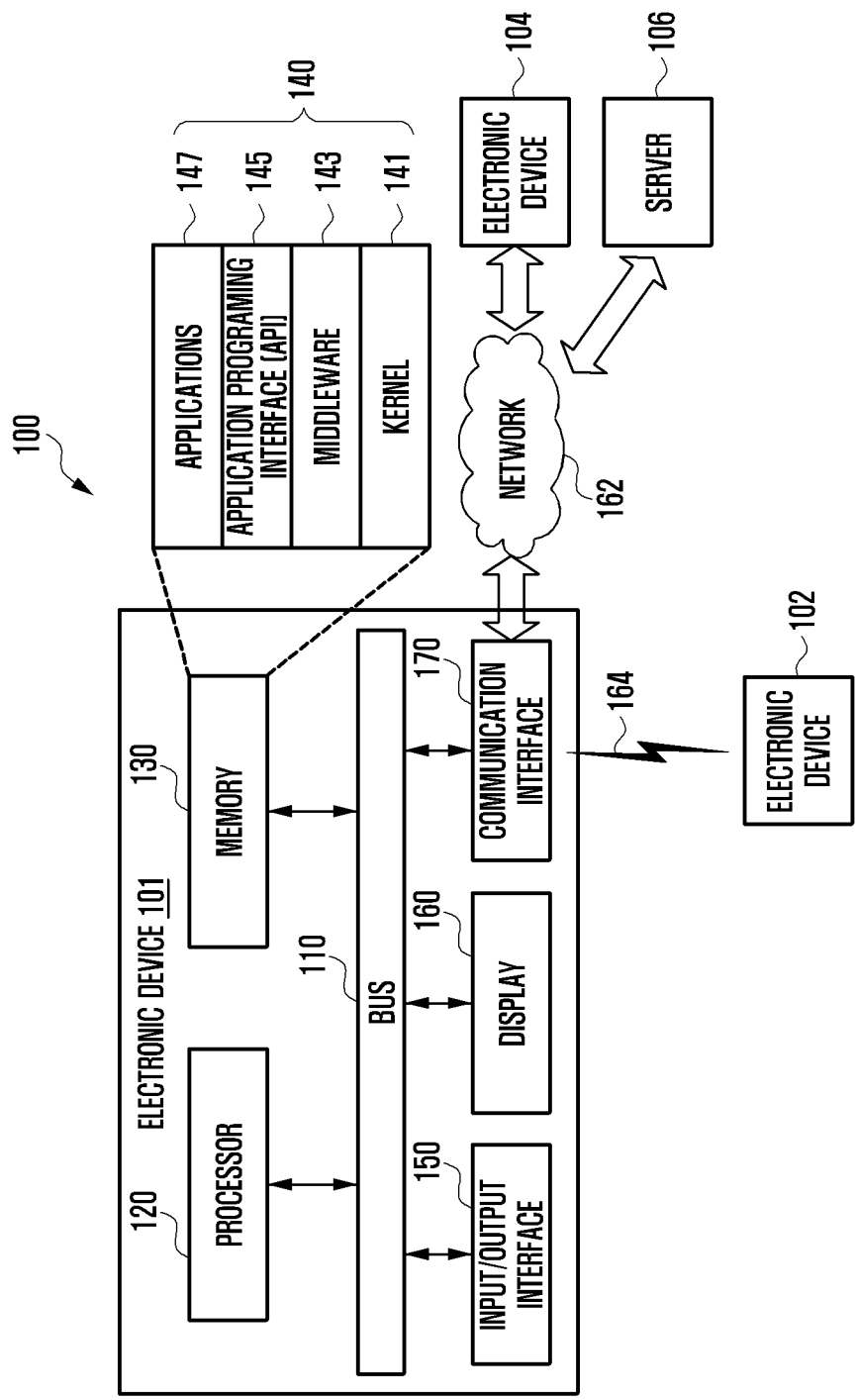
FIG. 1 illustrates an electronic device in a network environment according to embodiments of the present disclosure.

The following description is made with reference to the accompanying drawings and is provided to assist in a comprehensive understanding of embodiments of the present disclosure. It includes various specific details to assist in that understanding but these are to be regarded as merely examples. Accordingly, those of ordinary skill in the art will recognize that various changes and modifications of the embodiments described herein can be made without departing from the scope and spirit of the present disclosure. In addition, descriptions of well-known functions and constructions may be omitted for the sake of clarity and conciseness.

The terms and words used in the following description and claims are not limited to their dictionary meanings, but may simply be used to enable a clear and consistent understanding of the present disclosure. Accordingly, it should be apparent to those skilled in the art that the following description of embodiments of the present disclosure is provided for illustration purposes only and not for the purpose of limiting the present disclosure.

It is to be understood that the singular forms "a," "an," and "the" include plural referents unless the context clearly dictates otherwise. Thus, reference to "a component surface" includes reference to one or more of such surfaces.

The term "substantially" may generally indicate that the recited characteristic, parameter, or value need not be achieved exactly, but that deviations or variations, such as tolerances, measurement error, measurement accuracy limitations and other factors known to those of skill in the art, may occur in amounts that do not preclude the effect the characteristic was intended to provide.

Expressions such as "include" and "may include" which may be used in the present disclosure may refer to the presence of the disclosed functions, operations, and constituent elements and do not limit one or more additional functions, operations, and elements. For example, terms, such as "include" and/or "have" may be understood to refer to a certain characteristic, number, operation, constituent element, component or a combination thereof, but may not be construed to exclude the existence of or a possibility of addition of one or more other characteristics, numbers, operations, constituent elements, components or combinations thereof.

Furthermore, in the present disclosure, the expression "and/or" includes any and all combinations of the associated listed words. For example, the expression "A and/or B" may include A, B, or both A and B.

Expressions herein including ordinal numbers, such as "first" and "second," may modify various elements, but such elements are not limited by the above expressions. For example, the above expressions do not limit the sequence and/or importance of the elements. The above expressions are used merely for the purpose to distinguish an element from the other elements. For example, a first user device and a second user device indicate different user devices although both are user devices, and a first element could be referred to as a second element and a second element could be referred to as a first element without departing from the scope of the present disclosure.

When a component is referred to as being "connected" or "accessed" to other component, it should be understood that not only the component is directly connected or accessed to the other component, but also, there may exist another component between the components. Meanwhile, when a component is referred to as being "directly connected" or "directly accessed" to other component, it should be understood that there is no component therebetween.

An electronic device according to the present disclosure may include a communication function. For example the device may correspond to a combination of at least one of a smartphone, a tablet personal computer (PC), a mobile phone, a video phone, an e-book reader, a desktop PC, a laptop PC, a netbook computer, a personal digital assistant (PDA), a portable multimedia player (PMP), a digital audio player, a mobile medical device, an electronic bracelet, an electronic necklace, an electronic accessory, a camera, a wearable device, an electronic clock, a wrist watch, home appliances, such as an air-conditioner, vacuum, an oven, a microwave, a washing machine, or an air cleaner, an artificial intelligence robot, a television (TV), a digital versatile disc (DVD) player, an audio device, various medical devices including magnetic resonance angiography (MRA), magnetic resonance imaging (MRI), or computed tomography (CT) devices, a scanning machine, and a ultrasonic wave device, a navigation device, a global positioning system (GPS) receiver, an event data recorder (EDR), a flight data recorder (FDR), a set-top box, a TV box (for example, Samsung HomeSync™, Apple TV™, or Google TV™), an electronic dictionary, vehicle infotainment device, an electronic equipment for a ship, such as navigation equipment for a ship or a gyrocompass, avionics, a security device, electronic clothes, an electronic key, a camcorder, game consoles, a head-mounted display (HMD), a flat panel display device, an electronic frame, an electronic album, furniture or a portion of a building/structure that includes a communication function, an electronic board, an electronic signature receiving device, or a projector. It will be apparent to those skilled in the art that the electronic device according to the present disclosure is not limited to the aforementioned devices.

FIG. 1 illustrates example electronic devices in a network environment 100 according to embodiments of the present disclosure.

Referring to FIG. 1, an electronic device 101 may include a bus 110, a processor 120 including processing circuitry, a memory 130, an input/output interface 150 including interface circuitry, a display 160, a communication interface 170 including communication circuitry, and other similar and/or suitable components.

The bus 110 may interconnect deliver a communication between the above-described elements.

The processor 120 may include various processing circuitry, may receive commands from the above-described other elements through the bus 110, may interpret the received commands, may execute calculation or data processing according to the interpreted commands, and may include multiple processors without departing from the teachings herein.

The memory 130 may store commands or data received from or generated by the processor 120 or the other elements, and may include programming modules 140, such as a kernel 141, middleware 143, an application programming interface (API) 145, and applications 147. Each of the above-described programming modules may be implemented in software, firmware, hardware, or a combination of two or more thereof.

The kernel 141 may control or manage system resources such as the bus 110, the processor 120, and the memory 130, used to execute operations or functions implemented by other programming modules such as the middleware 143, the API 145, and at least one of the applications 147, and may provide an interface capable of accessing and controlling or managing the individual elements of the electronic device 100 by using the middleware 143, the API 145, or at least one of the applications 147.

The middleware 143 may serve to go between the API 145 or at least one of the applications 147 and the kernel 141 in such a manner that the API 145 or at least one of the applications 147 communicates with the kernel 141 and exchanges data therewith, and in relation to work requests received from one or more applications 140, may perform load balancing of the work requests by using a method of assigning a priority, in which system resources of the electronic device 100 can be used, to at least one of the applications 147.

The API 145 is an interface through which at least one of the applications 147 is capable of controlling a function provided by the kernel 141 or the middleware 143, and may include at least one interface or function for file control, window control, image processing, or character control.

The input/output interface 150 may include various interface circuitry, may receive a command or data as input from a user, and may deliver the received command or data to the processor 120 or the memory 130 through the bus 110. The display 160 may display a video, an image, or data to the user.

The communication interface 170 may include various communication circuitry and connect communication between electronic devices 102 and 104 and the electronic device 100, and may support a short-range communication protocol 164, such as Wi-Fi, Bluetooth (BT), and near field communication (NFC), or a network 162 communication including the Internet, a local area network (LAN), a wide area network (WAN), a telecommunication network, a cellular network, a satellite network, or a plain old telephone service (POTS). Each of the electronic devices 102 and 104 may be of an identical type as or a different type than the electronic device 100. The communication interface 170 may connect communication between the server 106 and the electronic device 100 via the network 162.

Figure 2:
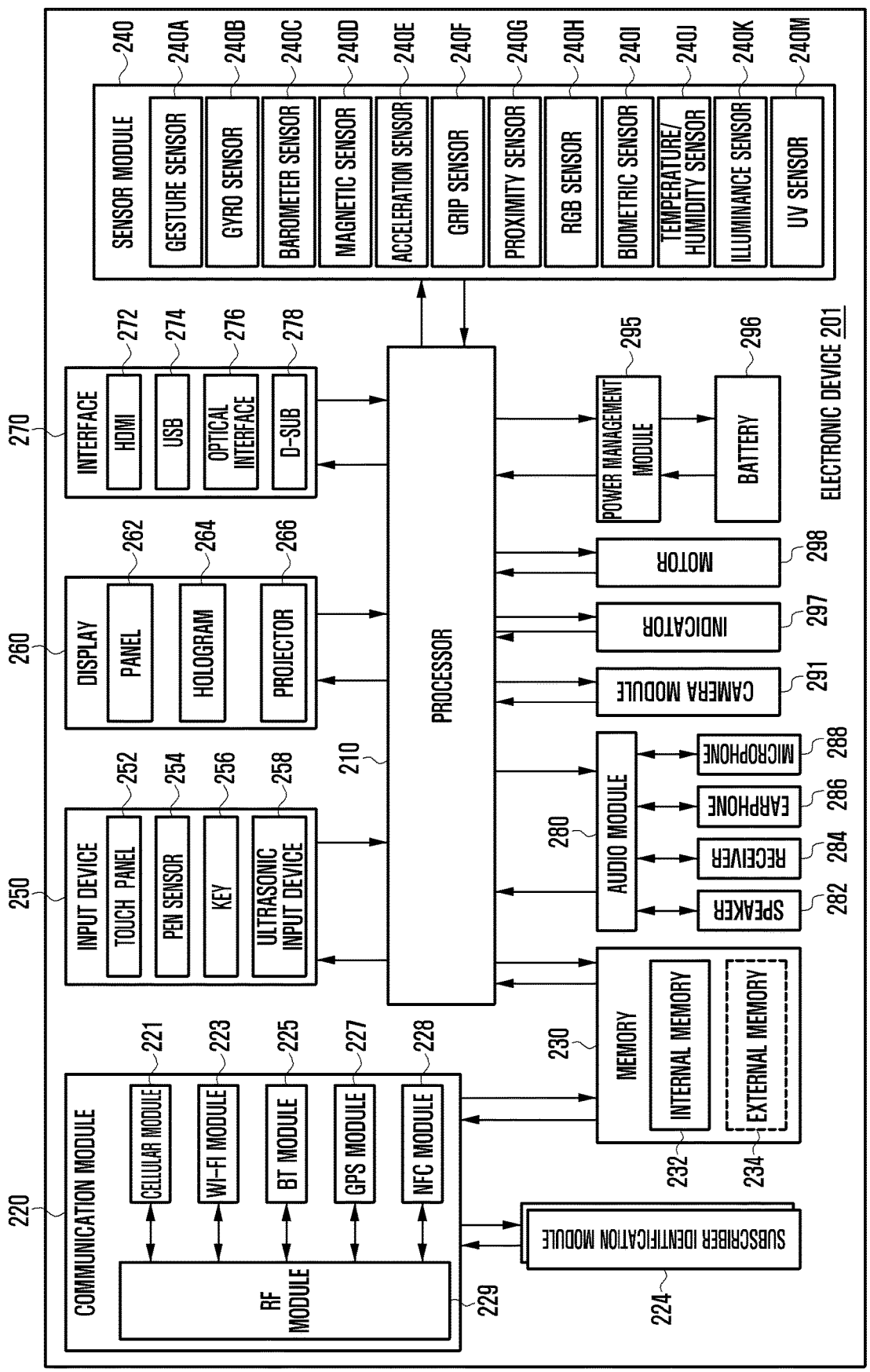
FIG. 2 illustrates an electronic device according to embodiments of the present disclosure.

FIG. 2 illustrates an example electronic device according to embodiments of the present disclosure.

Referring to FIG. 2, the electronic device 201 may include an application processor (AP) 210 including processing circuitry, a subscriber identification module (SIM) card 224, a memory 230, a communication module 220 including communication circuitry, a sensor module 240, an input device 250 including input circuitry, a display 260, an interface 270 including interface circuitry, an audio module (coder/decoder (codec) 280, a camera module 291, a power management module 295, a battery 296, an indicator 297, a motor 298 and any other similar and/or suitable components.

The processor 210 may include one or more of a dedicated processor, a CPU, APs, or communication processors (CPs). The AP and the CP may be included in the processor 210 in FIG. 2, may be included in different integrated circuit (IC) packages, respectively, and may be included in one IC package.

The AP may execute an operating system (OS) or an application program, and thereby may control multiple hardware or software elements connected to the AP, may perform processing of and arithmetic operations on various data including multimedia data, and may be implemented by a system on chip (SoC). According to an embodiment of the present disclosure, the processor 210 may further include a graphics processing unit (GPU).

The CP may manage a data line and may convert a communication protocol in communication between the electronic device 201 and different electronic devices connected to the electronic device 201 through the network. The CP may be implemented by an SoC, may perform at least some of multimedia control functions, may distinguish and authenticate a terminal in a communication network by using the SIM card 224, and may provide the user with services, such as a voice telephony call, a video telephony call, a text message, and packet data.

The CP may control the transmission and reception of data by the communication module 220. In FIG. 2, elements such as the power management module 295 and the memory 230 are illustrated as elements separate from the processor 210. However, according to an embodiment of the present disclosure, the processor 210 may include at least one of the above-described elements.

According to the present disclosure, the AP or the CP may load, to a volatile memory, a command or data received from at least one of a non-volatile memory and other elements connected to each of the AP and the CP, may process the loaded command or data, and may store, in a non-volatile memory, data received from or generated by at least one of the other elements.

The SIM card 224 may implement a SIM, and may be inserted into a slot formed in a particular portion of the electronic device 201. The SIM card 224 may include unique identification information, such as an IC card identifier (ICCID) or subscriber information, such as an international mobile subscriber identity (IMSI).

The memory 230 may include an internal memory 232 and/or an external memory 234. The internal memory 232 may include at least one of a volatile memory such as a dynamic random access memory (DRAM), a static RAM (SRAM), or a synchronous dynamic RAM (SDRAM), and a non-volatile memory such as a one time programmable read only memory (OTPROM), a programmable ROM (PROM), an erasable and programmable ROM (EPROM), an electrically erasable and programmable ROM (EEPROM), a mask ROM, a flash ROM, a not AND (NAND) flash memory, or a not OR (NOR) flash memory, and may be in the form of a solid state drive (SSD). The external memory 234 may further include a flash drive including a compact flash (CF), a secure digital (SD), a micro-SD, a mini-SD, an extreme digital (xD), or a memory stick.

The communication module 220 may include various communication circuitry including a radio frequency (RF) module 229, and may further include various communication circuitry including wireless communication modules to enable wireless communication through the RF module 229. The wireless communication modules may include a cellular module 221, a Wi-Fi module 223, a BT module 225, a GPS module 227, and/or a NFC module 228. Additionally or alternatively, the wireless communication modules may further include a network interface such as a local area network (LAN) card) or a modulator/demodulator (modem) for connecting the electronic device 201 to a network such as the Internet, a LAN, a WAN, a telecommunication network, a cellular network, a satellite network, or a POTS.

The communication module 220 may perform data communication with other electronic devices through a network.

The RF module 229 may be used for transmission and reception of data transmission and reception of RF signals or called electronic signals, may include a transceiver, a power amplifier module (PAM), a frequency filter, or a low noise amplifier (LNA) may further include a component for transmitting and receiving electromagnetic waves in a free space in a wireless communication such as a conductor or a conductive wire.

The sensor module 240 may include at least one of a gesture sensor 240A, a gyro sensor 240B, a barometer sensor 240C, a magnetic sensor 240D, an acceleration sensor 240E, a grip sensor 240F, a proximity sensor 240G, a red, green and blue (RGB) sensor 240H, a biometric sensor 240I, a temperature/humidity sensor 240J, an illuminance sensor 240K, and an ultra violet (UV) sensor 240M. The sensor module 240 may measure a physical quantity or may detect an operating state of the electronic device 201, may convert the measured or detected information to an electrical signal, and may further include an electronic nose (E-nose) sensor, an electromyography (EMG) sensor, an electroencephalogram (EEG) sensor, an electrocardiogram (ECG) sensor, a fingerprint sensor, an E-nose sensor, an EMG sensor, an EEG sensor, an ECG sensor, and a fingerprint sensor. The sensor module 240 may include a control circuit for controlling one or more sensors included therein or may be controlled by the processor 210.

The input device 250 may include various input circuitry, such as a touch panel 252, a pen sensor 254, keys 256, and an ultrasonic input device 258. The touch panel 252 may recognize a touch input in at least one of a capacitive scheme, a resistive scheme, an infrared scheme, and an acoustic wave scheme, and may further include a controller. In the capacitive type, the touch panel 252 is capable of recognizing proximity as well as a direct touch. The touch panel 252 may further include a tactile layer to provide a tactile response to the user.

The pen sensor 254 may be implemented by using a method identical or similar to a method of receiving a touch input from the user, or by using a separate sheet for recognition. For example, a key pad or a touch key may be used as the keys 256. The ultrasonic input device 258 enables the terminal to detect a sound wave by using a microphone 288 of the terminal through a pen generating an ultrasonic signal, and to identify data, and is capable of wireless recognition. According to an embodiment of the present disclosure, the electronic device 201 may receive a user input from an external device such as a network, a computer, or a server, which is connected to the electronic device 201, through the communication module 220.

The display 260 may include a panel 262, a hologram 264, and a projector 266. The panel 262 may be a liquid crystal display (LCD) and an active matrix organic light emitting diode (AM-OLED) display, but is not limited thereto, may be implemented so as to be flexible, transparent, or wearable, and may include the touch panel 252 and one module. The hologram 264 may display a three-dimensional image in the air by using interference of light. The projector 266 may include light-projecting elements, such as LEDs, to project light into external surfaces. The display 260 may further include a control circuit for controlling the panel 262, the hologram 264, or the projector 266.

The interface 270 may include various interface circuitry, such as a high-definition multimedia interface (HDMI) 272, a universal serial bus (USB) 274, an optical interface 276, and a d-subminiature (D-sub) 278, and may include an SD/multi-media card (MMC) or infrared data association (IrDA) port.

The audio module (codec) 280 may bidirectionally convert between a voice and an electrical signal, and may convert voice information, which is input to or output from the audio module 280, through a speaker 282, a receiver 284, an earphone 286, or the microphone 288.

The camera module 291 may capture an image and a moving image and may include one or more image sensors, such as a front lens or a back lens, an image signal processor (ISP), and a flash LED.

The power management module 295 may manage power of the electronic device 201, and may include a power management IC (PMIC), a charger IC, or a battery gauge.

The PMIC may be mounted to an IC or an SoC semiconductor. Charging methods may be classified into a wired charging method and a wireless charging method. The charger IC may charge a battery, and may prevent an overvoltage or an overcurrent from a charger to the battery. The charger IC may be for at least one of the wired charging method and the wireless charging method. Examples of the wireless charging method may include a magnetic resonance method, a magnetic induction method, and an electromagnetic method. Additional circuits including a coil loop, a resonance circuit, or a rectifier for wireless charging may be added in order to perform the wireless charging.

The battery gauge may measure a residual quantity of the battery 296, or a voltage, a current or a temperature during the charging. The battery 296 may supply power by generating electricity, and may be a rechargeable battery.

The indicator 297 may indicate particular states of the electronic device 201 or a part of the electronic device 201 such as a booting, message, or charging state. The motor 298 may convert an electrical signal into a mechanical vibration.

Although not illustrated, the electronic device 201 may include a processing unit for supporting a module TV, which processing unit may process media data according to standards, such as digital multimedia broadcasting (DMB), digital video broadcasting (DVB), or media flow. Each of the above-described elements of the electronic device 201 according to an embodiment of the present disclosure may include one or more components, and the name of the relevant element may change depending on the type of electronic device. The electronic device 201 may include at least one of the above-described elements, may omit some of the above-described elements, or may further include additional elements. In addition, some of the elements of the electronic device 201 may be combined into one entity, which may perform functions identical to those of the relevant elements before the combination.

The term "module" used in the present disclosure may refer to a unit including one or more combinations of hardware, software, and firmware, may be interchangeable with a term, such as "unit," "logic," "logical block," "component," or "circuit," may be a minimum unit of a component formed as one body or a part thereof, may be a minimum unit for performing one or more functions or a part thereof, and may be implemented mechanically or electronically. For example, the "module" according to an example embodiment of the present disclosure may include at least one of a dedicated processor, a CPU, an application-specific integrated circuit (ASIC) chip, a field-programmable gate array (FPGA), and a programmable-logic device for performing certain operations which are known or are to be developed in the future.

Figure 3:
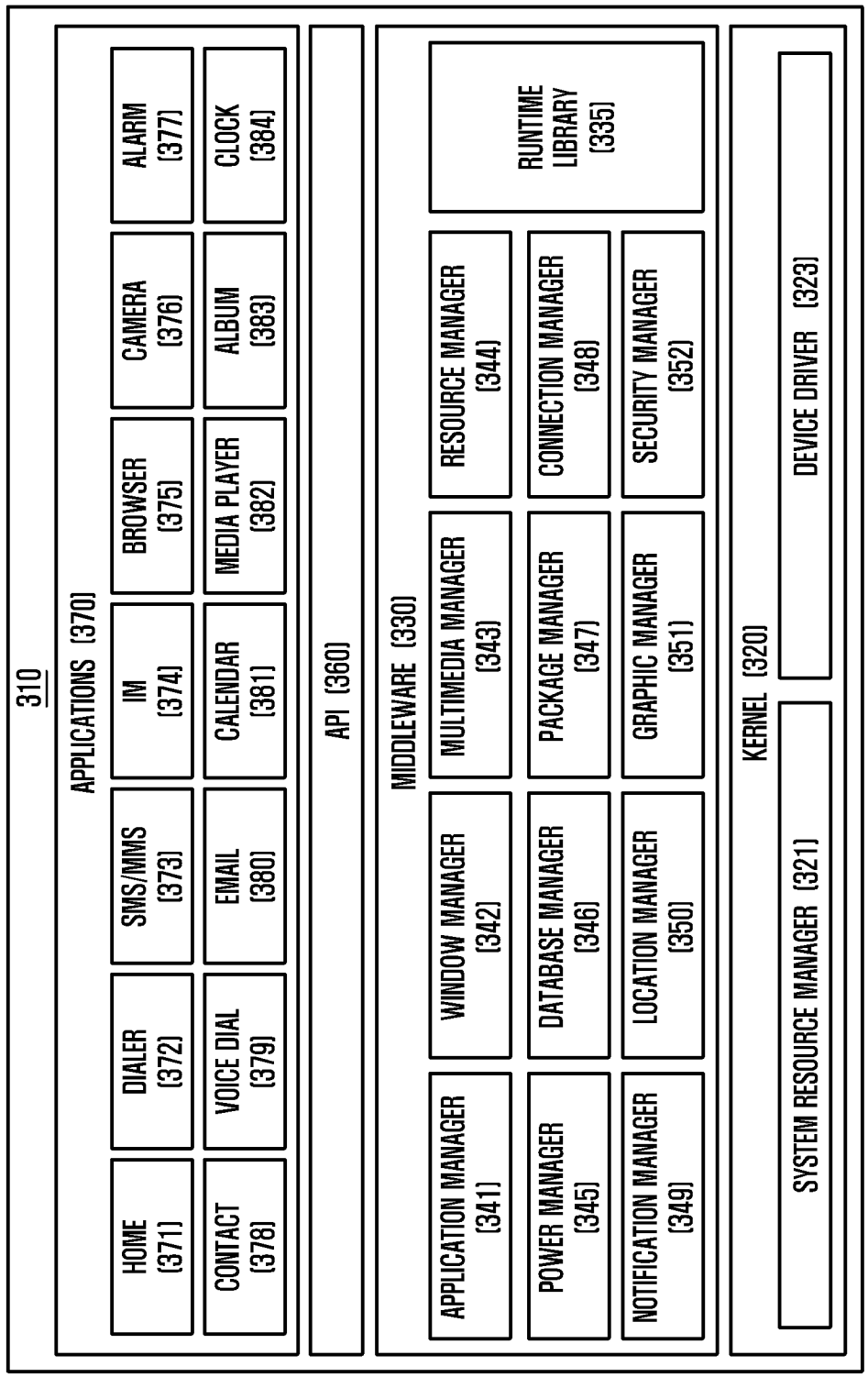
FIG. 3 illustrates a program module according to embodiments of the present disclosure.

FIG. 3 illustrates an example configuration of a programming module according to an embodiment of the present disclosure.

Referring to FIG. 3, a programming module 310 may be stored in the electronic device 100 or may be stored in the electronic device 201 illustrated in FIG. 1. At least a part of the programming module 310 may be implemented in software, firmware, hardware, or a combination of at least two thereof. The programming module 310 may be implemented in hardware, and may include an OS controlling resources related to an electronic device and/or various applications 370 executed in the OS, which may be Android, iOS, Windows, Symbian, Tizen, or Bada.

Referring to FIG. 3, the programming module 310 may include a kernel 320, middleware 330, an API 360, and/or at least one of the applications 370.

The kernel 320 may include a system resource manager 321 and/or a device driver 323. The system resource manager 321 may include a process manager, a memory manager, and a file system manager, and may perform the control, allocation, or recovery of system resources. The device driver 323 may include a display driver, a camera driver, a BT driver, a shared memory driver, a USB driver, a keypad driver, a Wi-Fi driver, and/or an audio driver, and may include an inter-process communication (IPC) driver.

The middleware 330 may include multiple modules previously implemented so as to provide a function used in common by the applications 370, and may provide a function to the applications 370 through the API 360 in order to enable the applications 370 to efficiently use limited system resources within the electronic device. For example, as illustrated in FIG. 3, the middleware 330 may include at least one of a runtime library 335, an application manager 341, a window manager 342, a multimedia manager 343, a resource manager 344, a power manager 345, a database manager 346, a package manager 347, a connection manager 348, a notification manager 349, a location manager 350, a graphic manager 351, a security manager 352, and any other suitable and/or similar manager.

The runtime library 335 may include a library module used by a compiler, in order to add a new function by using a programming language during the execution of the applications 370, and may perform functions which are related to input and output, the management of a memory, an arithmetic function.

The application manager 341 may manage a life cycle of at least one of the applications 370. The window manager 342 may manage graphical user interface (GUI) resources used on the screen. The multimedia manager 343 may detect a format used to reproduce various media files and may encode or decode a media file through a codec appropriate for the relevant format. The resource manager 344 may manage resources, such as a source code, a memory, or a storage space of at least one of the applications 370.

The power manager 345 may operate together with a basic input/output system (BIOS), may manage a battery or power, and may provide power information and the like used for an operation. The database manager 346 may manage a database in such a manner as to enable the generation, search and/or change of the database to be used by at least one of the applications 370. The package manager 347 may manage the installation and/or update of an application distributed in the form of a package file.

The connection manager 348 may manage a wireless connectivity, such as Wi-Fi and BT. The notification manager 349 may display or report, to the user, an event, such as an arrival message, an appointment, or a proximity alarm in such a manner as not to disturb the user. The location manager 350 may manage location information of the electronic device. The graphic manager 351 may manage a graphic effect, which is to be provided to the user, and/or a user interface related to the graphic effect. The security manager 352 may provide various security functions used for system security or user authentication. When the electronic device has a telephone function, the middleware 330 may further include a telephony manager for managing a voice telephony call function and/or a video telephony call function of the electronic device.

The middleware 330 may generate and use a new middleware module through various functional combinations of the above-described internal element modules, may provide modules specialized according to types of OSs in order to provide differentiated functions, and may dynamically delete some of the existing elements, or may add new elements. Accordingly, the middleware 330 may omit some of the elements described in the embodiments of the present disclosure, may further include other elements, or may replace the some of the elements with elements that perform a similar function and have a different name.

The API 360 is a set of API programming functions, and may be provided with a different configuration according to an OS. In the case of Android or iOS, one API set may be provided to each platform. In the case of Tizen, two or more API sets may be provided to each platform.

The applications 370 may include a preloaded application and/or a third party application, such as a home application 371, a dialer application 372, a short message service (SMS)/multimedia message service (MMS) application 373, an instant message (IM) application 374, a browser application 375, a camera application 376, an alarm application 377, a contact application 378, a voice dial application 379, an electronic mail (e-mail) application 380, a calendar application 381, a media player application 382, an album application 383, a clock application 384, and any other suitable and/or similar application.

At least a part of the programming module 310 may be implemented by instructions stored in a non-transitory computer-readable storage medium. When the instructions are executed by one or more processors, the one or more processors may perform functions corresponding to the instructions. The non-transitory computer-readable storage medium may be the memory 230. At least a part of the programming module 310 may be executed by the processor and may include a module, a program, a routine, a set of instructions, and/or a process for performing one or more functions.

Names of the elements of the programming module 310 according to an embodiment of the present disclosure may change depending on the type of OS. The programming module may include one or more of the above-described elements, may omit some of the above-described elements or may further include additional elements. The operations performed by the programming module or other elements may be processed in a sequential, parallel, repetitive, or heuristic method. Some of the operations may be omitted, or other operations may be added to the operations.

Figure 4:
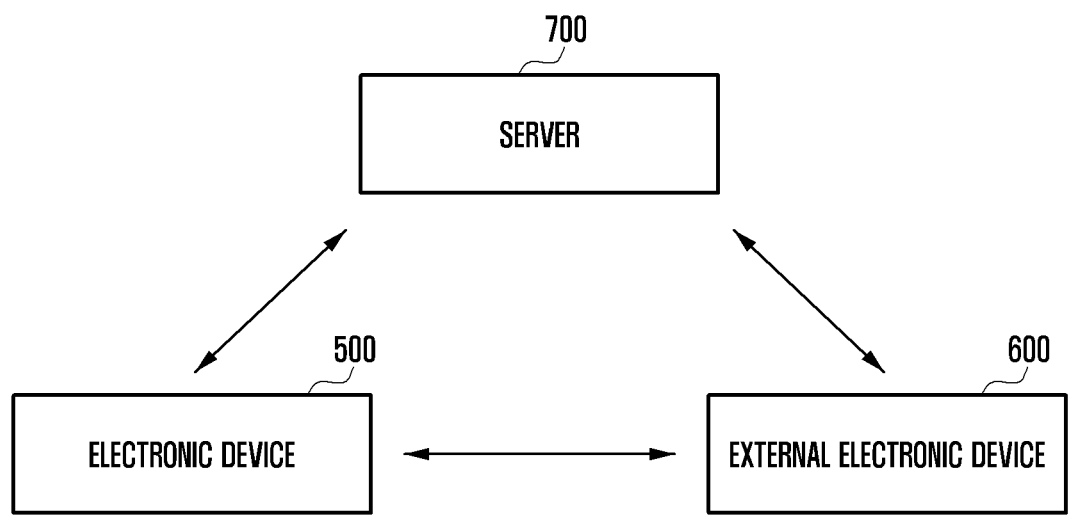
FIG. 4 illustrates operating subjects according to embodiments of the present disclosure.

FIG. 4 illustrates operating subjects according to embodiments of the present disclosure.

Referring to FIG. 4, the operating subjects include an electronic device 500, an external electronic device 600, and a server 700.

Although the electronic device 500 does not transmit user identification information as it is, the electronic device 500 can distinguish a user of the electronic device 500 from another user, and can prevent the user identification information from being exposed to a third party while transmitting temporary identification information to the external electronic device 600 because user identification information cannot be extracted.

According to an embodiment of the present disclosure, the electronic device 500 can generate temporary identification information by using key information of an electronic device, key information of an external electronic device, and time variant key information in order to distinguish data corresponding to a user of the electronic device 500 and data corresponding to users of another electronic device. Hereinafter, a configuration for generating temporary identification information and transmitting/receiving data combined with the temporary identification information will be described in detail.

Figure 5:
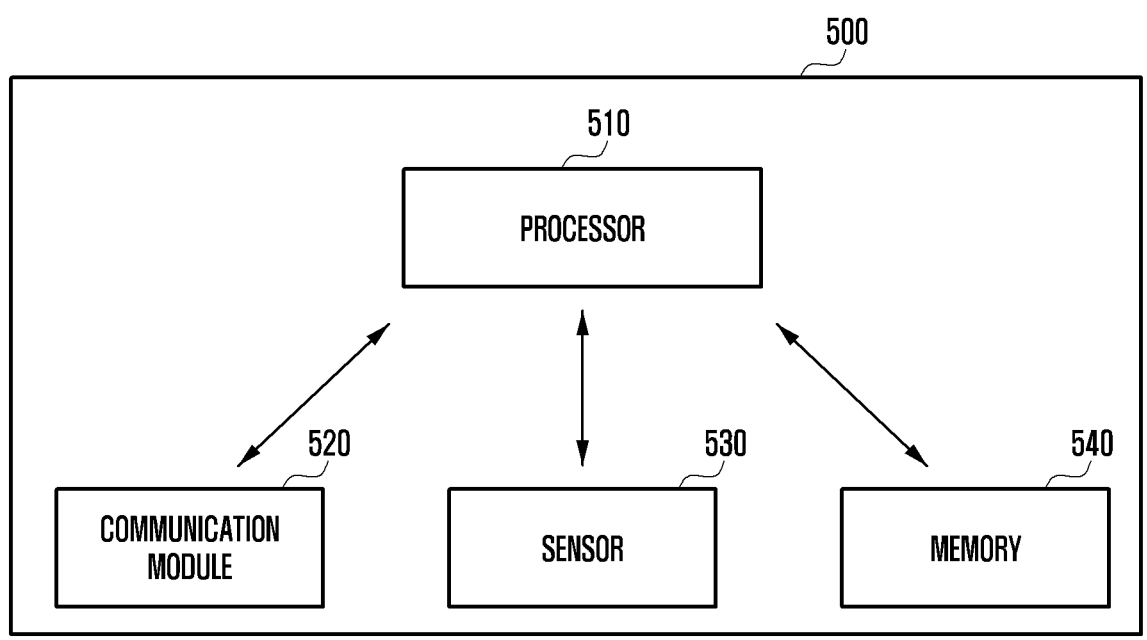
FIG. 5 illustrates the electronic device of FIG. 4 according to an embodiment of the present disclosure.
Figure 6:
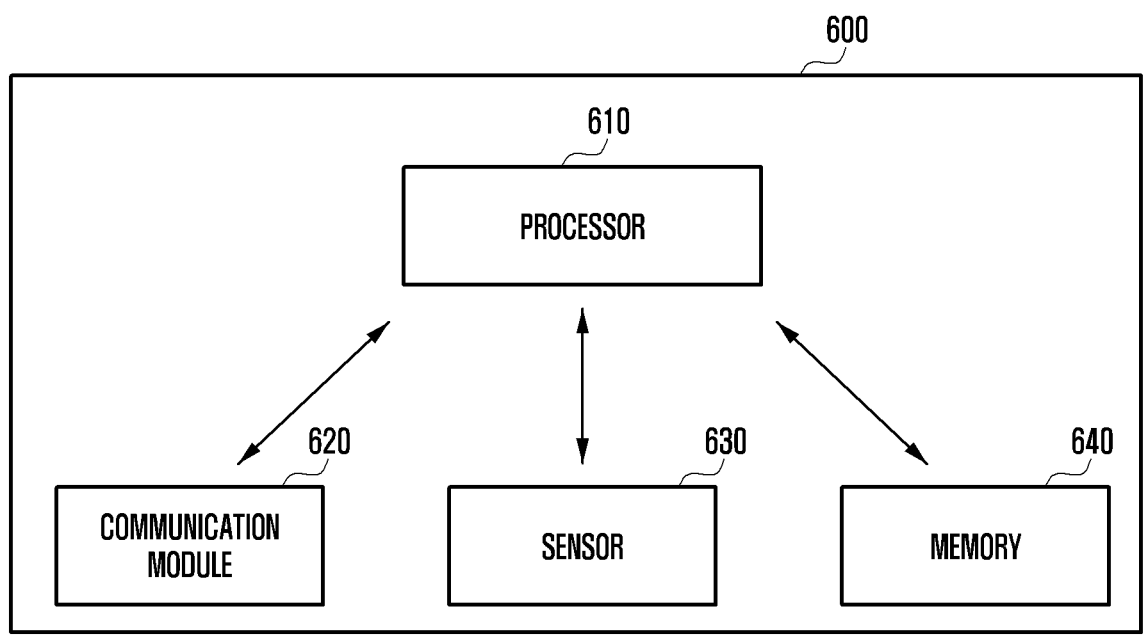
FIG. 6 illustrates the external electronic device of FIG. 4 according to an embodiment of the present disclosure.

FIG. 5 illustrates the electronic device of FIG. 4, according to an embodiment of the present disclosure. FIG. 6 illustrates the external electronic device of FIG. 4 according to an embodiment of the present disclosure.

With reference to FIG. 5, the electronic device 500 may include a processor 510, communication module 520, sensor 530 and memory 540.

The communication module 520 can receive key information of the external electronic device 600 from the external electronic device 600 and data from the server 700. The communication module 520 may indicate the communication module 220 illustrated in and previously described regarding FIG. 2. The key information of the external electronic device 600 may indicate identification information which can distinguish the external electronic device 600 from another external electronic device, and may include at least one of a MAC address of the external electronic device 600, Internet protocol (IP) address of the external electronic device 600, and Internet mobile equipment identity (IMSI) of the external electronic device 600. The key information of the external electronic device 600 is not limited to the above examples and may indicate unique information only for the external electronic device.

The processor 510 can generate temporary identification information based on at least two of key information of an external electronic device received from the external electronic device 600, key information of the electronic device 500, and time variant key information. The key information of the electronic device 500 may indicate identification information for distinguishing the electronic device 500 from other electronic devices, and may include at least one of a MAC address of the electronic device 500, IP address of the electronic device 500, and IMSI of the electronic device 500. The key information of the electronic device 500 is not limited to the above examples and may mean unique information only for the electronic device 500. The temporary identification information may indicate identification information used for distinguishing user data of the electronic device 500 from user data of other electronic devices, and can be matched with data transmitted from the electronic device 500 or the external electronic device 600 to the server 700.

According to an embodiment, the temporary identification information may be used as a temporary tag which is attached to data transmitted from the electronic device 500 or the external electronic device 600 to the server 700. Because the temporary tag is matched with data stored in the server 700, if the electronic device 500 or the external electronic device 600 transmits the temporary tag to the server 700, the server 700 can transmit data corresponding to the transmitted temporary tag to the electronic device 500 or the external electronic device 600. The temporary identification information can also be combined with data transmitted from the electronic device 500 or the external electronic device 600 to the server 700. Because the temporary identification information is matched with data stored in the server 700, if the electronic device 500 or the external electronic device 600 transmits the temporary identification information to the server 700, the server 700 can transmit data corresponding to the transmitted temporary identification information to the electronic device 500 or the external electronic device 600.

The time variant key may indicate a value which changes in a predetermined period. For example, the time variant key stored in the electronic device 500 may indicate a key arranged with time requested for the time variant key. If the processor 510 requests a time variant key stored in the memory 540 at 17:30, Aug. 24, 2016, the time variant key can be expressed as 201608241730. The time variant key can be expressed as 34 which is the sum of digits included in 201608241730. The temporary identification information according to an embodiment of the present disclosure can be generated by additionally considering the time variant key. Accordingly, the temporary identification information can be generated differently according to the time even though the key of the electronic device 500 and the key of the external electronic device 600 are identical.

According to embodiments of the present disclosure, the processor 510 can perform the following operations:

The processor can generate temporary identification information by using all of the key information of the electronic device 500, key information of the external electronic device 600, and time variant key information, can generate a character string including a key of the electronic device 500, key of the external electronic device 600, and time variant key, and can generate temporary identification information by converting the character string.

The processor can generate temporary identification information by using a character string randomly arranged with the key of the electronic device 500, key of the external electronic device 600, and time variant key.

The processor 510 can assign the character string generated with the key information of the electronic device 500, key information of the external electronic device 600, and time variant key information to the temporary identification information by applying a hash function.

The processor 510 can transmit the generated temporary identification information to the external electronic device 600 by using the communication module 520.

The processor 510 can transmit the generated temporary identification information to the server 700 in order to receive data collected by the external electronic device 600. The server 700 can extract and/or merge data corresponding to temporary identification information stored in a temporary data storage by using the temporary identification information, and move the data to a user account data storage. The data stored in the user account data storage can be transmitted to the electronic device 500.

The processor 510 can synchronize data stored in the electronic device 500 and data stored in a user account formation storage of the server 700, and can determine encryption of data transmitted from the external electronic device 600 to the server 700.

According to embodiments of the present disclosure, a user of the electronic device 500 can determine the encryption of data, such as by selecting the encryption of data from a screen output to a display of the electronic device 500.

The processor 510 can determine a type of data collected by the external electronic device 600, and determine encryption of data based on the type of data. For example, if the external electronic device 600 collects data related to personal information of a user, the processor 510 can determine to encrypt the data collected by the external electronic device 600.

The processor 510 can determine encryption of data based on location information of the external electronic device 600. For example, if the external electronic device 600 is located at a hospital, data collected by the external electronic device 600 may be important data related to a user's body information requiring data encryption. Accordingly, the processor 510 can determine encryption of data collected by the external electronic device 600, and request the external electronic device 600 for the encryption.

The processor 510 can determine encryption of data based on location information collected by the sensor module 540. For example, if the electronic device 500 is located at a hospital, the processor 510 can determine encryption for user data of the electronic device 500, which can be collected by an external electronic device. The processor 510 can transmit information for encrypting user data of the electronic device 500 to the external electronic device 600 through the communication module 520.

The processor 510 can determine encryption of data based on additional information of the external electronic device 600 received through the communication module 520. The additional information of the external electronic device 600 may include attribute information of the external electronic device 600. If the processor 510 obtains additional information through the communication module 520 that the external electronic device 600 is located at a hospital, the processor 510 can determine encryption of data collected by a sensor of the external electronic device 600 or pre-stored data.

The processor 510 can determine encryption of data Based on at least one of a user input, location of the electronic device 500, and attribute of the external electronic device 600, which includes a processor 610, communication module 620, sensor 630 and memory 640. The processor 510 can control the communication module 520 to transmit a message including execution of encryption to the external electronic device 600, which can receive the message including execution of encryption, and can encrypt data obtained by the sensor 630 or data stored in the memory 640 by using at least one method based on the content of the message. The external electronic device 600 can transmit information related to encryption such as algorithm type of encryption and key information used for encryption, to the electronic device 500 through the communication module 620.

If encrypted data is received from the server 700 by using temporary identification information, the processor 510 can decrypt the encrypted information by using information related to the encryption.

If data being transmitted from the external electronic device 600 to the server 700 is determined to be encrypted, the processor 510 can transmit a signal requesting for encryption to the external electronic device 600.

The sensor module 540 may include at least one sensor. According to embodiments of the present disclosure, the sensor module 540 may include various sensors such as an acceleration sensor, gyro sensor, geomagnetic sensor, and biosensor. The sensor module 540 can obtain user data such as a number of a user's steps, biometric information, and location information, by using at least one sensor included in the sensor module 540. The user data obtained by the sensor module 540 can be transmitted to the server 700 together with temporary identification information through the communication module 520. The user data transmitted to the server 700 can also be transmitted to the external electronic device 600. The content of user data transmitted to the external electronic device 600 will be described later. The above description has been made by assuming that the electronic device 500 receives data collected by the external electronic device 600. The electronic device 500 can also transmit data to the external electronic device 600.

The processor 510 can control so that the generated temporary identification information and data are transmitted to the external electronic device 600 and the server 700, which includes a user account data storage 710, temporary data storage 730, and communication module 720.

The data to be transmitted may be stored in a user account data storage of the server 700, and may include user data obtained by the sensor module 540 of the electronic device 500 or user data stored in the memory 540 of the electronic device 500.

The data can be transmitted to a user account data storage 710 of the server 700 according to a predetermined condition, such as a transmission condition according to a predetermined period. The electronic device 500 can transmit a message to the server so that the data stored in the user account data storage 710 can be moved to a temporary data storage 730 together with the temporary identification information.

While requesting the server 700 for data, the external electronic device 600 can transmit the temporary identification information received from the electronic device 500. The server 700 can receive the temporary identification information transmitted by the external electronic device 600, extract data corresponding to the temporary identification information from the user account data storage, and transmit the data corresponding to the temporary identification information to the external electronic device 600.

The processor 510 can determine encryption of data to be transmitted based on at least one of a user input, user data of the electronic device 500, and additional information of the external electronic device 600. If the encryption of data is determined, the processor 510 can encrypt the data to be transmitted and control the communication module 520 to transmit a message including information related to the encryption, such as the type of encryption algorithm and key information used for encryption, to the external electronic device 600. If the data encrypted by using the temporary identification information is received from the server 700, the external electronic device 600 can decrypt the encrypted data by using the information related to the encryption.

According to embodiments of the present disclosure, the electronic device 500 can generate temporary identification information so as not to expose the electronic device 500 or user identification information of the electronic device 500. The temporary identification information can be generated by applying a character string arranged with a key of the electronic device 500, key of the external electronic device 600, and a time variant key to a hash function. Although an output value corresponding a specific input value is used, the hash function has a characteristic of outputting another value different from the specific input value. Accordingly, the key of the electronic device 500 is not exposed even though a third party obtains the temporary identification information.

FIG. 6 is a block diagram illustrating the external electronic device 600 of FIG. 4, which as previously noted, may include a processor 610, communication module 620, sensor 630, and memory 640.

The processor 610 can control the communication module 620 to transmit key information of the external electronic device 600 to the electronic device 500 which can receive the key information of the external electronic device 600 and generate temporary identification information by using the key information of the external electronic device 600. The processor 610 can receive the temporary identification information generated by the electronic device 500 through the communication module 620. The detailed description of generating temporary identification information has been given in relation to FIG. 5, and thus will be omitted here.

In order to transmit data stored in the memory 640 or data obtained by the sensor 630 to the electronic device 500, the processor 610 can transmit the data stored in the memory 640 or the data obtained by the sensor 630 to the server 700 together with the received temporary identification information.

The communication module 620 can receive the temporary identification information transmitted by the electronic device 500.

The sensor 630 can collect various data, such as user data of the electronic device 500 including blood pressure, exercise information, and blood sugar content for a user of the electronic device 500. Although FIG. 6 illustrates a sensor 630 included in the external electronic device 600, the sensor 630 can be separated from the external electronic device 600, and data collected by the sensor 630 can be transmitted to the external electronic device 600 by using a separate communication means. For example, if a user exercises using a treadmill, the external electronic device 600 can receive data collected by a sensor included in the treadmill, such as speed and exercise time. The external electronic device 600 can transmit data collected by a separate sensor to the server 700 together with temporary identification information.

If a request for encrypting data to be transmitted from the electronic device 500 to the server 700 is received, the processor 610 can perform encryption of data to be transmitted to the server 700 among data stored in the memory 640. The encrypted data can be transmitted to the server 700 together with the temporary identification information.

The data to be transmitted to the server 700 can be encrypted by using the temporary identification information as a password key. Because the server 700 stores the temporary identification information transmitted by the electronic device 500, the server can decrypt the encrypted data.

The processor 610 can transmit data to the server 700 by using an address generated by using the temporary identification information. For example, if a temporary tag received by the external electronic device 600 from the electronic device 500 is "a1w3f65" and the uniform resource locator (URL) of the server 700 is http://abcd.com/, the external electronic device 600 can transmit data to URL http://abcd.com/a1w3f65, which is generated by using the temporary identification information and can be stored in a temporary data storage of the server 700. Detailed descriptions of generating an URL by using the temporary identification information will be made with reference to FIG. 7.

In order to receive data of the electronic device 500, the processor 610 can transmit temporary identification information received from the electronic device 500 to the server 700. The server 700 can transmit data corresponding to the received temporary identification information to the external electronic device 600. Detailed descriptions of this will be made with reference to FIG. 7.

Figure 7:
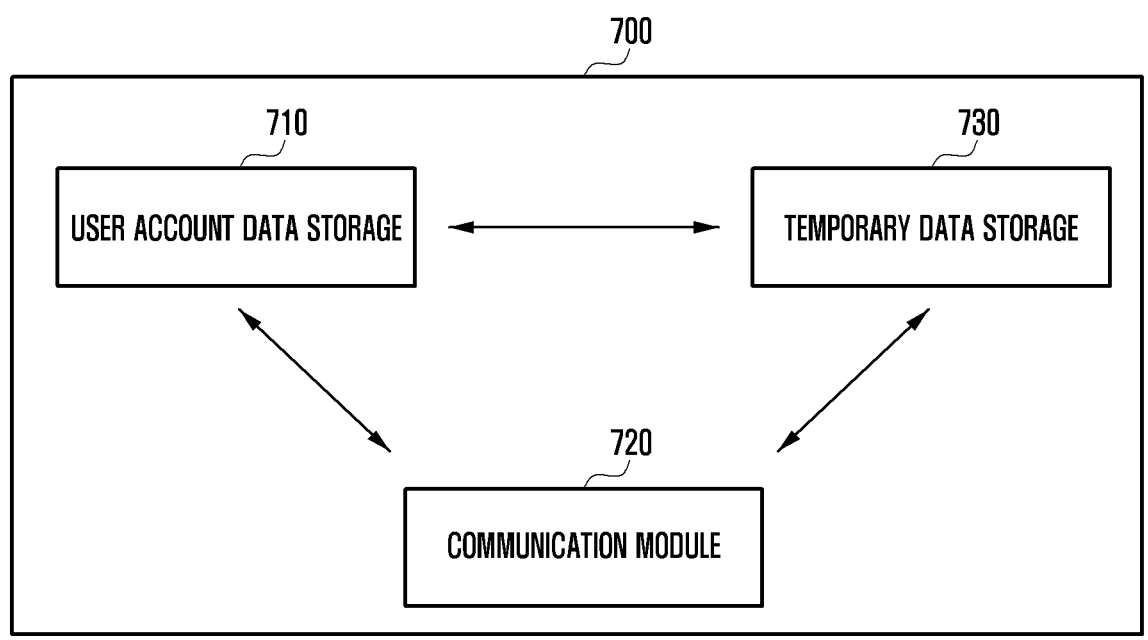
FIG. 7 illustrates the server of FIG. 4 according to an embodiment of the present disclosure.

FIG. 7 illustrates the server 700 of FIG. 4, which as previously noted, may include a user account data storage 710, temporary data storage 730, and communication module 720.

Although FIG. 7 illustrates that a user account data storage 710 and a temporary data storage 730 are configured in a server 700, the user account data storage 710 and the temporary data storage 730 can be configured separately in different servers.

The user account data storage 710 can store data for each user account registered in the server 700, and can be configured with a memory.

The temporary data storage 730 can store data transmitted by the external electronic device 600 and temporary identification information corresponding to the data. According to an embodiment of the present disclosure, the data transmitted by the external electronic device 600 can be stored in the temporary data storage 730 by mapping onto the temporary identification information.

A processor included in the server 700 can extract and merge data corresponding to the temporary identification information transmitted by the electronic device 500 among data stored in the temporary data storage 730 by receiving a data transmission request signal and the temporary identification information from the electronic device 500. The merged data can be moved from the temporary data storage 730 to the user account data storage 710. The data stored in the user account data storage 710 can be transmitted to the electronic device 500 and synchronized with data stored in the electronic device 500. Alternatively, the data stored in the temporary data storage 730 can be transmitted to the electronic device 500.

The data transmitted by the external electronic device 600 can be transmitted to the electronic device 500 by using the temporary identification information. Because identification information or personal information of a user of the electronic device 500 cannot be extracted from the temporary identification information, the personal information of the user is not exposed to the outside.

If the data of the electronic device 500 and the temporary identification information transmitted by the external electronic device 600 are received, a processor can control to move data of the electronic device 500 stored in the user account data storage 710 to the temporary data storage 730. The data stored in the temporary data storage 730 can be transmitted to the external electronic device 600, which can use the received data of the electronic device 500. For example, if the data of the electronic device 500 is health information of a user, the external electronic device 600 can perform a function of identifying a health state of the user.

Figure 8A:
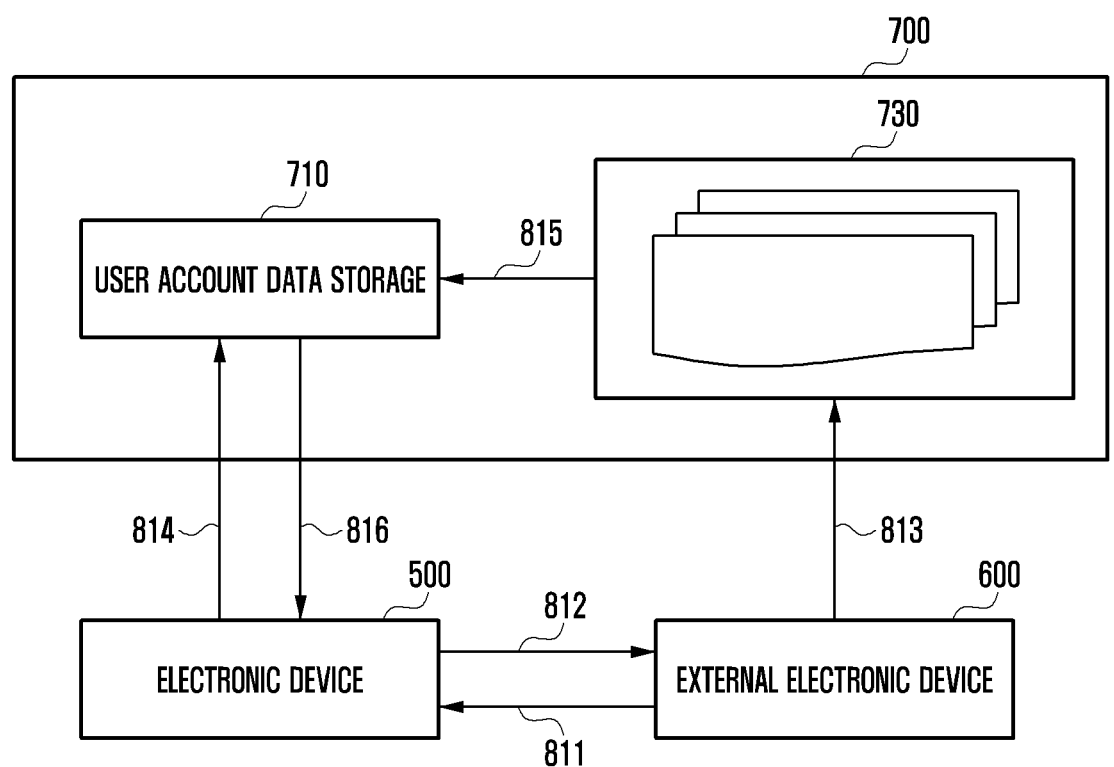
FIGS. 8A and 8B illustrate a method for transmitting and receiving data according to embodiments of the present disclosure.

FIG. 8A illustrates how the electronic device 500 according to embodiments of the present disclosure obtains data collected by the external electronic device 600 by using the temporary identification information.

The electronic device 500 can be connected to the external electronic device 600 by using at least one of various communication means, such as NFC, Bluetooth™, and Wi-Fi.

The external electronic device 600 can transmit key information of the external electronic device 600 to the electronic device 500. The key information is information with which an external electronic device and another electronic device can be distinguished and may correspond to a media access control (MAC) address, GPS location information, and their combinations.

The electronic device 500 receives key information of the external electronic device 600 in step 811 and generates temporary identification information by using combinations including at least two of key information of the external electronic device 600, key information of the electronic device 500, and time variant key information. The detailed description of generating temporary identification information has been provided above.

The electronic device 500 transmits the generated temporary identification information to the external electronic device 600 in step 812.

The external electronic device 600 collects user data of the electronic device 500 and transmits the collected user data to the server together with temporary identification information in step 813. The data transmitted by the external electronic device 600 can be stored in the temporary data storage 730 of the server 700, and the external electronic device 600 can transmit data collected by using a sensor to the server 700 together with temporary identification information.

The electronic device 500 transmits a data request signal to the user account data storage 710 of the server 700 in step 814. In this case, the electronic device can transmit the data request signal to the server 700 together with the temporary identification information.

If the data request signal is received, the server 700 can extract data corresponding to the temporary identification information from the temporary data storage 730. The data extracted from the temporary data storage 730 is merged, and the merged data is moved and stored in the user account data storage 710 in step 815.

If a predetermined time elapses after storing the data in the temporary data storage 730, or if the data is moved to the user account data storage 710 or the external electronic device 600, the data stored in the temporary data storage 730 can be deleted.

The server 700 transmits data stored in the user account data storage 710 to the electronic device 500 in step 816. The electronic device 500 or the server 700 can synchronize the data stored in the user account data storage 710 with the data stored in the electronic device 500.

The temporary data storage 730 and the user account data storage 710 may be configured in the server 700, or configured separately in different servers.

As described above, the temporary identification information can be used for distinguishing data corresponding to the electronic device 500 from other data, and the key of the electronic device 500 cannot be reclaimed because the temporary identification information is a value generated by applying key information of the electronic device 500 to a hash function. Accordingly, the temporary identification information does not expose identification information and user identification information of the electronic device 500 to the outside.

Figure 8B:
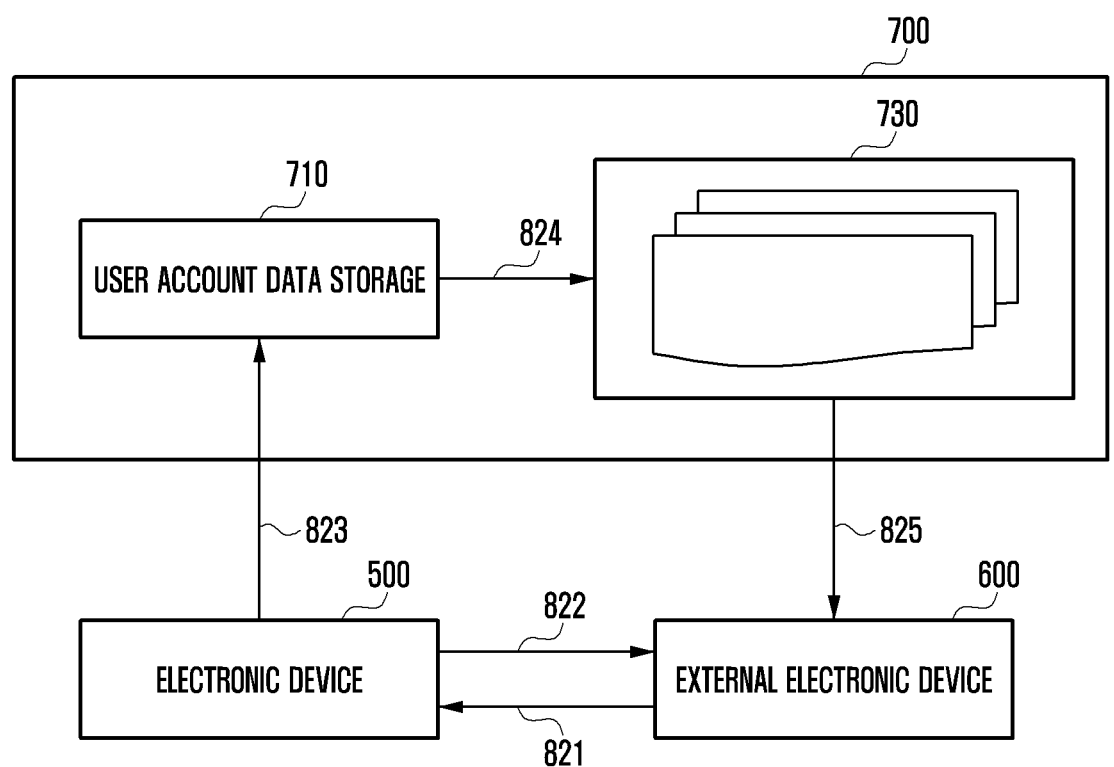

FIG. 8B illustrates how the electronic device 500 provides user data of the electronic device 500 for the external electronic device 600 by using the temporary identification information according to embodiments of the present disclosure.

The electronic device 500 can be connected to the external electronic device 600 by using at least one of various communication means such as NFC, Bluetooth™, and Wi-Fi.

The external electronic device 600 transmits key information of the external electronic device 600 to the electronic device 500 in step 821. The key information of the external electronic device 600 may indicate information with which an external electronic device can be distinguished from other electronic devices and may correspond to a MAC address, GPS location information, and their combinations.

The electronic device 500 receives key information of the external electronic device 600 in step 821 and can generate temporary identification information by using combinations including at least two of a key of the external electronic device 600, key of the electronic device 500, and a time variant key. The detailed configuration of generating the temporary identification information has been described above.

The electronic device 500 transmits the generated temporary identification information to the external electronic device 600 in step 822, and the temporary identification information can also be transmitted to the server 700. Data and temporary identification information stored in the electronic device 500 are transmitted to the server 700 in step 823. The data transmitted from the electronic device 500 to the server 700 can be stored in the user account data storage 710, and the temporary identification information can be transmitted to the server simultaneously when transmitting the data from the electronic device 500 to the server 700.

The external electronic device 600 can transmit a data request signal to the server 700 in order to receive data stored in the electronic device 500. According to an embodiment of the present disclosure, the external electronic device 600 can transmit the temporary identification information received from the electronic device 500 to the server 700 together with a data request signal.

The server 700 stores the data transmitted by the electronic device 500 and the temporary identification information in the temporary data storage 730 by mapping the data excluding identification information of the electronic device 500 from the data transmitted by the electronic device 500 and temporary identification information in step 824. Alternatively, the server 700 stores data in the temporary data storage 730 by deleting identification information of the electronic device 500 from the data and mapping onto the temporary identification information in step 824.

The server 700 transmits data corresponding to the temporary identification information to the external electronic device 600 in step 825. According to an embodiment of the present disclosure, the server 700 can extract data corresponding to the temporary identification information stored in the temporary data storage 730 and transmit the data to the external electronic device 600.

If a request signal for data corresponding to the temporary identification information is not received after a predetermined time elapses, the server 700 can delete data corresponding to the temporary identification information from the temporary data storage 730.

Figure 9A:
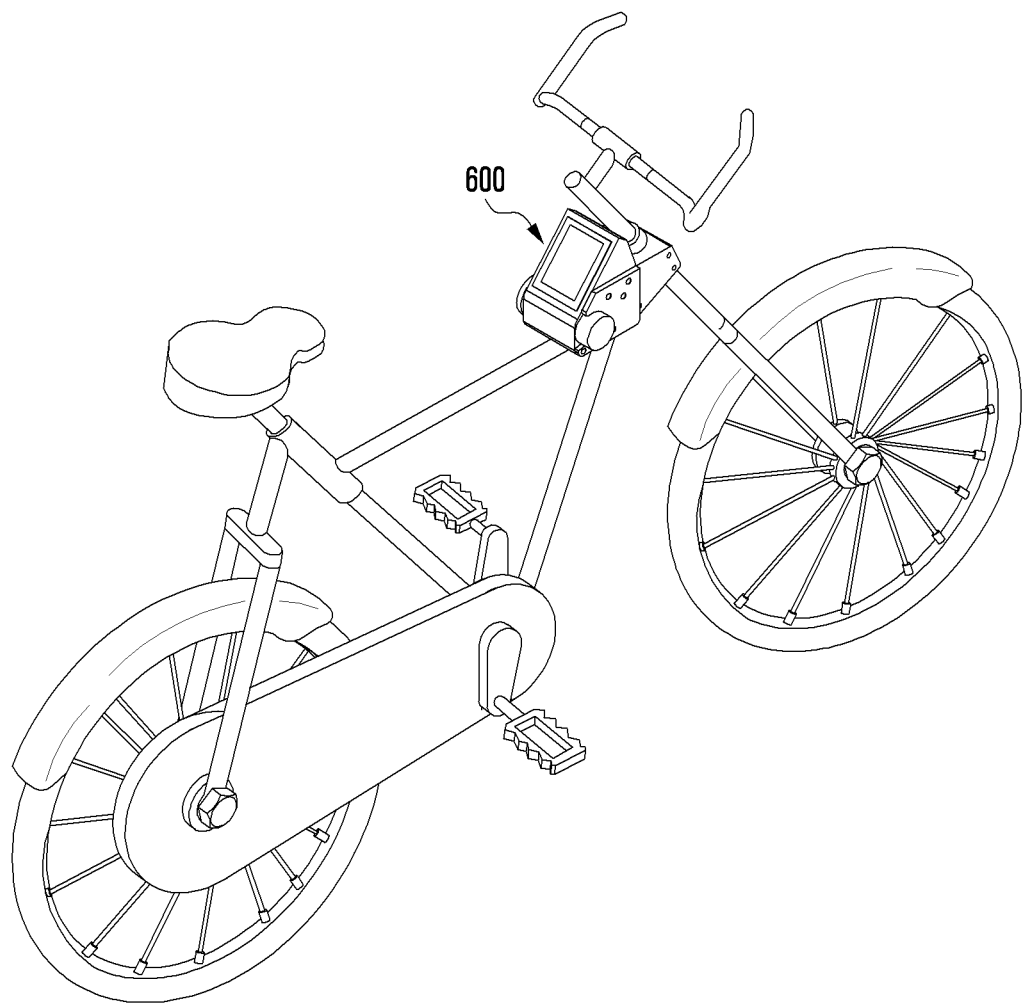
FIGS. 9A and 9B illustrate external electronic devices according to embodiments of the present disclosure.
Figure 9B:
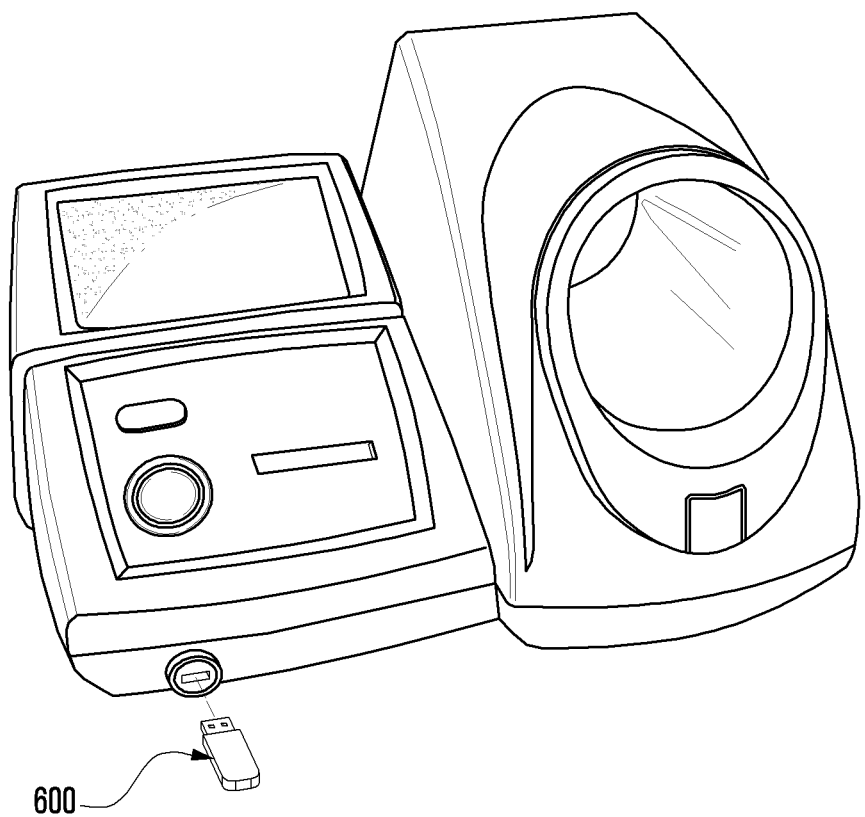

FIGS. 9A and 9B illustrate external electronic devices according to embodiments of the present disclosure.

The external electronic device may be a public electronic device that can be used by a plurality of users, such as a public electronic device including a photographing and transmitting device installed on a street and an electronic device for measuring body information of users. Although FIGS. 9A and 9B illustrate a bicycle and a blood pressure checker as examples of external electronic devices, the external electronic device is not limited thereto. For example, the external electronic device may include exercise equipment such as a running machine and a bench press that can obtain exercise data of users. The external electronic device may include a body weight scale, bio-impedance analyzer, and blood glucose monitoring device that can obtain biometric data, as well as a separate computing device and a server installed in a hospital. The external electronic device 600 can collect data without using a sensor by receiving data from equipment used by a plurality of users, and can receive data from the equipment used by a plurality of users through communication means such as a Wi-Fi, Bluetooth™, and NFC.

With reference to FIG. 9A, the external electronic device 600 can be combined with a bicycle and can receive temporary identification information generated by the electronic device 500 and collect a user's activation data, such as speed, location, and riding time, generated while the user of the electronic device 500 uses the bicycle. The collected data can be transmitted to the server 700 together with the temporary identification information. The server 700 can receive a data request signal transmitted by the electronic device 500 and transmit the collected data to the electronic device 500.

With reference to FIG. 9B, the external electronic device 600 can be combined with a blood pressure checker, which can measure a blood pressure of a user of the electronic device 500 and transmit the measured blood pressure to the external electronic device 600, which can transmit data received from the blood pressure checker and temporary identification information to the server 700. The server 700 can transmit the data to the electronic device 500 in response to a data request signal received from the electronic device 500. In this manner, the user of the electronic device 500 can receive blood pressure measured by the blood pressure checker.

The external electronic device 600 shown in FIG. 9A can collect data by using a sensor installed in the external electronic device 600, or can be connected to a separate data collecting device and transmit data collected by the separate data collecting device to the server 700.

Although FIG. 9B illustrates the external electronic device 600 combined with a blood pressure checker, the present disclosure is not limited thereto. For example, the external electronic device 600 can be combined with an auxiliary exercise device such as a treadmill and an indoor bicycle. Data collected by the auxiliary device can be transmitted to the external electronic device 600, which can transmit temporary identification information and the received data to the server 700.

An electronic device according to embodiments of the present disclosure, as previously described herein, includes a communication module, and a processor, wherein the processor is configured to receive through the communication module key information of an external electronic device from the external electronic device processing at least one item of user data of the electronic device, to generate temporary identification information based on at least one of the received key information of the external electronic device and key information of the electronic device, and to transmit the generated temporary identification information to the external electronic device through the communication module.

The processor is configured to generate the temporary identification information based on at least one of key information of the electronic device, key information of the external electronic device, and time variant key information by using the time variant key information additionally.

The processor is configured to further receive additional information of the external electronic device from the external electronic device through the communication module and to determine to encrypt user data of the electronic device based on the received additional information of the external electronic device.

The processor is configured to calculate a current location of the electronic device by using the communication module and to determine to encrypt user data of the electronic device based on the calculated current location of the electronic device.

The processor is configured to transmit through the communication module information related to the encryption of user data of the electronic device to the external electronic device.

The processor is configured to receive through the communication module user data of the electronic device obtained by the external electronic device from a server by using the generated temporary identification information.

The processor is configured to transmit through the communication module a command for transmitting user data of the electronic device stored in a server to an account server related to a user of the electronic device by using the generated temporary identification information.

The electronic device further includes a memory and the processor is configured to transmit through the communication module the user data of the electronic device stored in the memory to the server together with the generated temporary identification information.

The processor is configured to transmit a command for transmitting the generated temporary identification information to a first database of a server and moving user data of the electronic device stored in the first database to a second database of the server together with the temporary identification information.

The at least one item of user data of the electronic device comprises biometric data, exercise data, and user information.

An electronic device according to another embodiment of the present disclosure includes a communication module at least one sensor configured to collect data; and a processor, wherein the processor is configured to transmit key information of the electronic device to an external electronic device through the communication module, to receive temporary identification information from the external electronic device through the communication module, and to transmit data obtained by the at least one sensor to a server through the communication module by using the received temporary identification information.

The processor is configured to receive information for encrypting data collected by the at least one sensor from the external electronic device through the communication module, and to encrypt the data collected by the at least one sensor based on the received information.

The processor transmits the data to the server by using an address generated based on the temporary identification information.

An electronic device according to another embodiment of the present disclosure includes a communication module, and a processor, wherein the processor is configured to transmit key information of the electronic device to an external electronic device through the communication module, to receive temporary identification information from the external electronic device through the communication module, and to receive at least one item of user data of the electronic device from a server by using the received temporary identification information.

Figure 10:
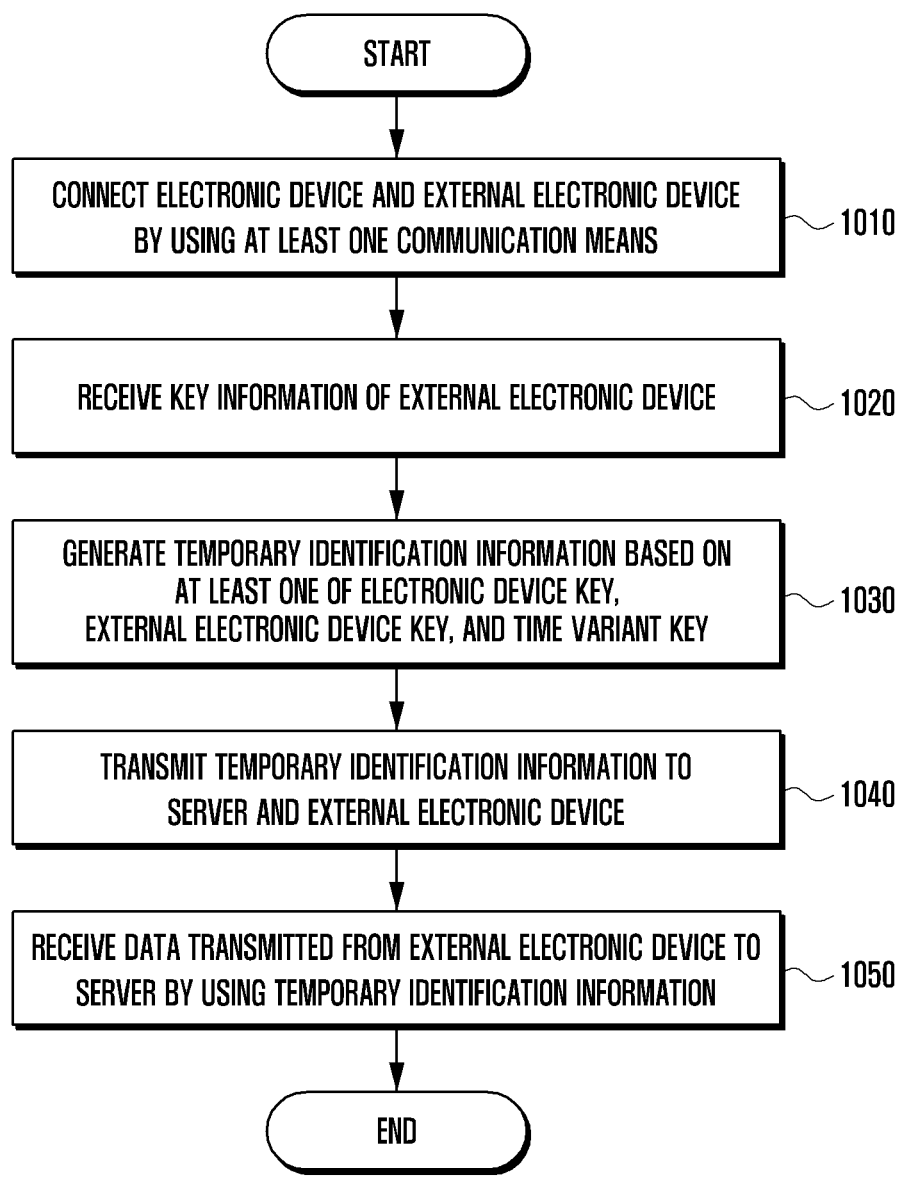
FIG. 10 illustrates a method for operating an electronic device according to an embodiment of the present disclosure.

FIG. 10 illustrates a method for operating an electronic device according to an embodiment of the present disclosure.

With reference to FIG. 10, in the method for operating an electronic device according to an embodiment of the present disclosure, first an electronic device connects with an external electronic device by using at least one communication means in step 1010.

The electronic device receives key information of the external electronic device in step 1020.

The electronic device generates temporary identification information by using at least one of a key of the electronic device, key of the external electronic device, and time variant key in step 1030.

The electronic device transmits the generated temporary identification information to the external electronic device in step 1040. The external electronic device can transmit data stored in the external electronic device to a server together with the temporary identification information. The server can store the data transmitted by the external electronic device in a temporary data storage.

The electronic device can transmit a data request signal and the temporary identification information to the server, and the server can extract data corresponding to the temporary identification information and transmit the extracted data to the electronic device. The electronic device receives the data transmitted by the server in step 1050.

Figure 11A:
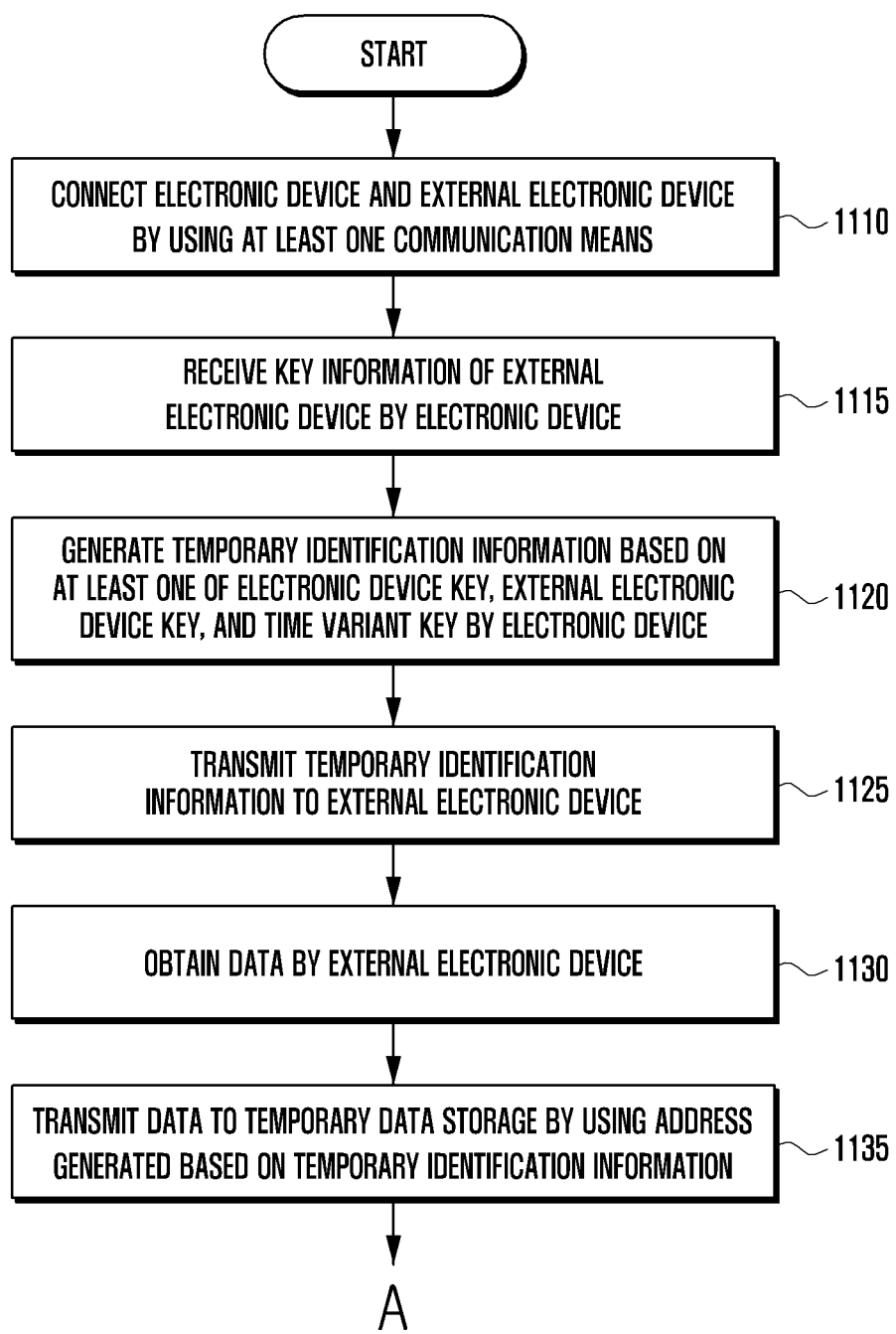
FIGS. 11A and 11B illustrate a method for receiving data in an electronic device according to embodiments of the present disclosure.
Figure 11B:
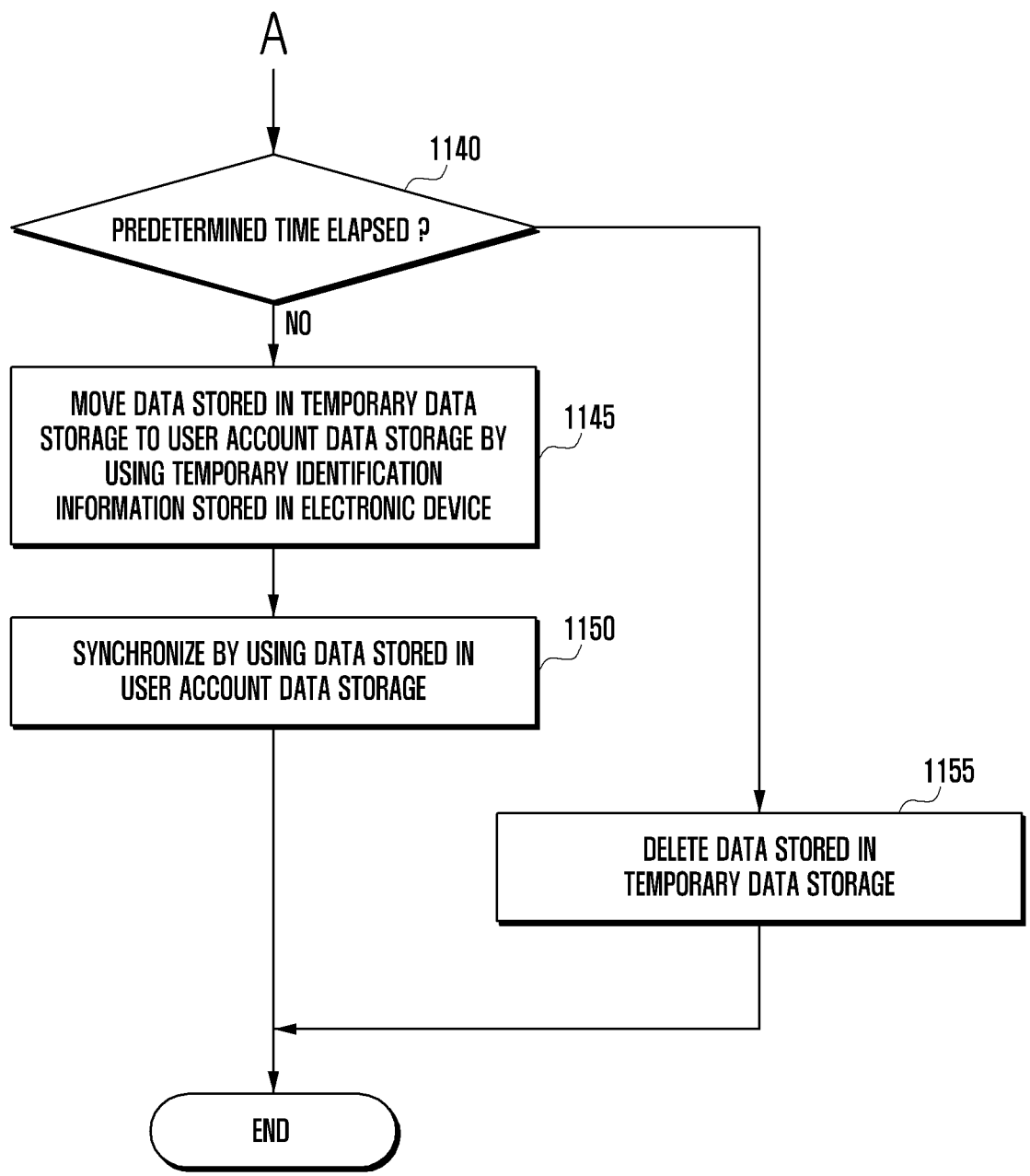

FIGS. 11A and 11B illustrate a method for receiving data in an electronic device according to embodiments of the present disclosure.

With reference to FIGS. 11A and 11B, the electronic device connects with an external electronic device by using at least one communication means in step 1110.

The electronic device receives key information of the external electronic device in step 1115.

The electronic device generates temporary identification information by using at least one of a key of the electronic device, key of the external electronic device, and time variant key in step 1120. The method for generating temporary identification information has been described above.

The electronic device transmits the generated temporary identification information to the external electronic device in step 1125.

The external electronic device collects data in step 1130, and transmits pre-stored data or collected data to the server in step 1135. According to an embodiment of the present disclosure, the pre-stored data can includes data related to the biometric information of the user.

According to an embodiment of the present disclosure, the external electronic device can transmit data by using a URL generated based on the temporary identification information to a temporary data storage of the server. The server can store the data by classifying the data according to the temporary identification information stored in the temporary data storage.

The server determines in step 1140 whether a predetermined time has elapsed after storing the data in the temporary data storage. If the predetermined time has elapsed, the data stored in the temporary data storage is deleted in step 1155.

If it is determined that the predetermined time has not elapsed in step 1140, the server receives the temporary identification information transmitted by the electronic device and controls to move the data corresponding to the temporary identification information from the temporary data storage to a user account data storage in step 1145.

The server synchronizes the data stored in the user account data storage with the data stored in the electronic device in step 1150.

Figure 12A:
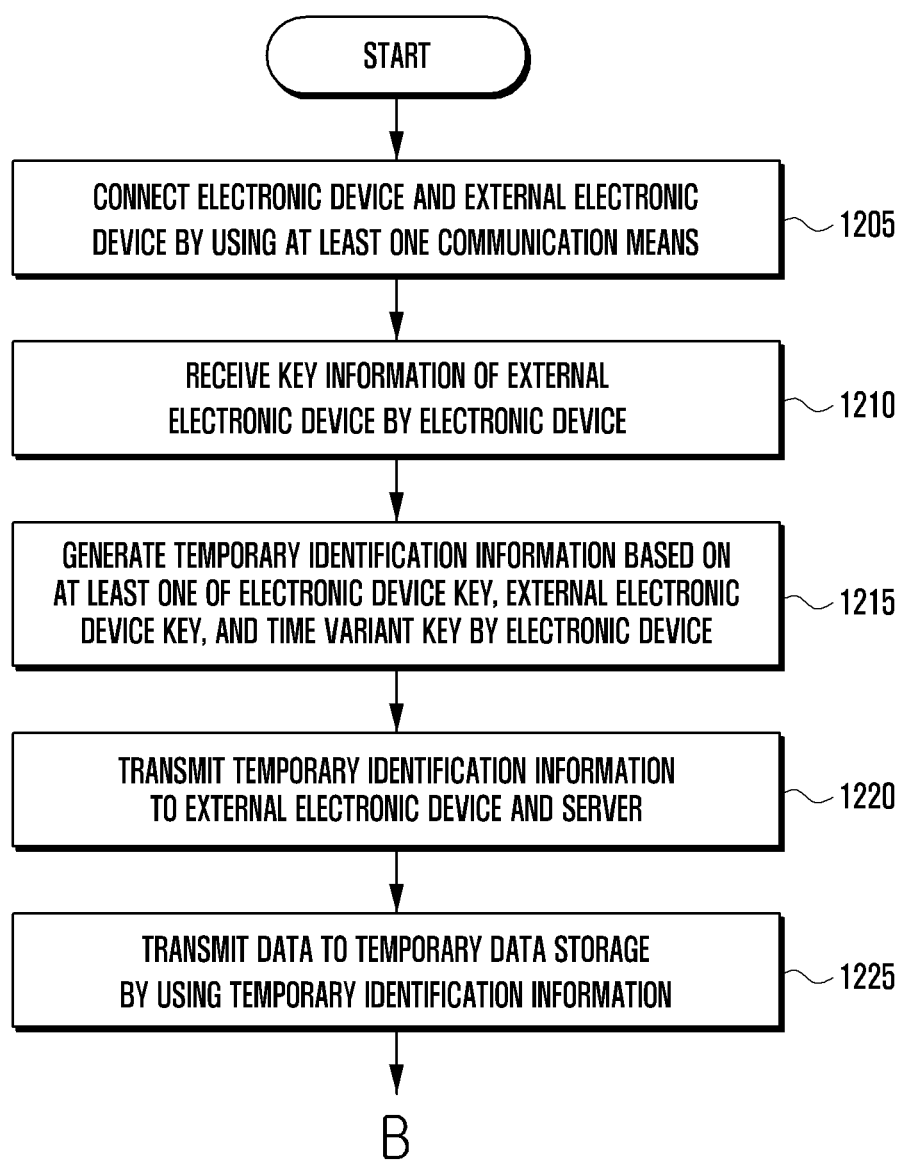
FIGS. 12A and 12B illustrate a method for transmitting data in an electronic device according to embodiments of the present disclosure.
Figure 12B:
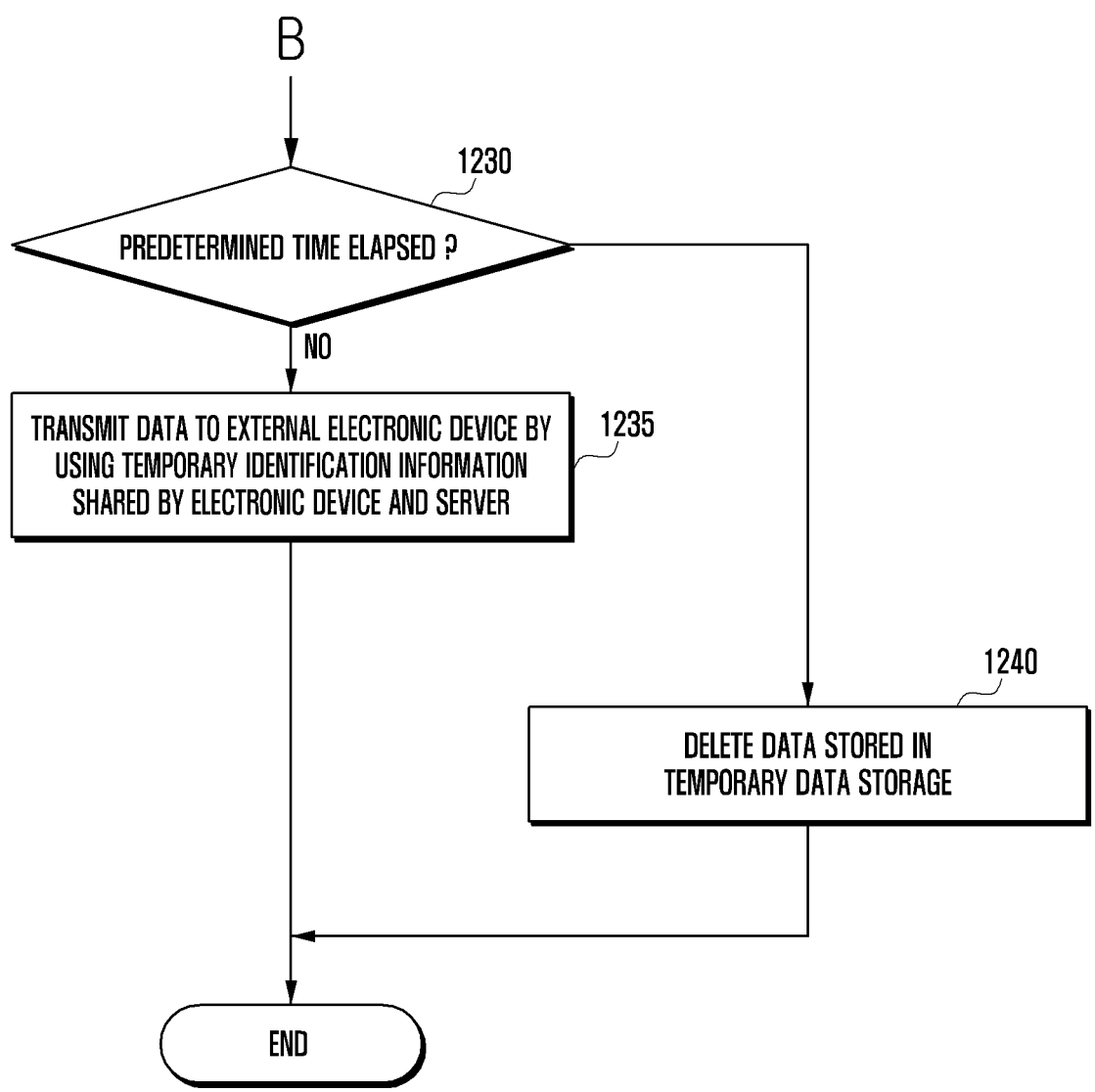

FIGS. 12A and 12B illustrate a method for transmitting data in an electronic device according to embodiments of the present disclosure.

With reference to FIGS. 12A and 12B, the electronic device connects with an external electronic device by using at least one communication means in step 1205.

The electronic device receives key information of the external electronic device in step 1210.

The electronic device generates temporary identification information by using at least one of a key of the electronic device, key of the external electronic device, and time variant key in step 1215. The method for generating temporary identification information has been described above.

The electronic device transmits the generated temporary identification information to the external electronic device or the server in step 1220. According to an embodiment of the present disclosure, the electronic device can also transmit data stored in the electronic device and temporary identification information to the server. According to an embodiment of the present disclosure, the data stored in the electronic device can includes data related to the biometric information of the user.

The data transmitted by the electronic device can be first stored in a user account data storage of the server, and moved to a temporary data storage by mapping onto the received temporary identification information in step 1225. According to an embodiment of the present disclosure, data corresponding to identification information of the electronic device among the data transmitted from the electronic device, data from which data corresponding to user identification information of the electronic device is deleted, and data mapped onto the temporary identification information can be moved to the temporary data storage.

The server determines in step 1230 whether a predetermined time has elapsed after storing the data in the temporary data storage; and, if the predetermined time has elapsed, deletes the data stored from the temporary data storage in step 1240.

The server can maintain the data as it is if the predetermined time has not elapsed by storing the data in the temporary data storage. The external electronic device can request the server so that the temporary identification information transmitted by the electronic device and data corresponding to the electronic device can be received. The server can transmit data corresponding to the temporary identification information transmitted by the external electronic device among data stored in the temporary data storage to the external electronic device in step 1235.

An electronic device and a method for operating the electronic device according to embodiments of the present disclosure can transmit and receive data safely without exposing personal information of a user by generating temporary identification information based on at least two of key information of an electronic device, key information of an external electronic device, and time variant key information, and by transmitting/receiving user data of the of the electronic device with the generated temporary identification information.

Because the temporary identification information is generated by inputting a key of the electronic device, key of the external electronic device, and time variant key through a hash function, data security can be increased without exposing user identification information, even though a third party obtains the temporary identification information.

The data security can be further increased by performing encryption of data according to the situation of the external electronic device or the electronic device.

A method of an electronic device according to embodiments of the present disclosure, as previously described, includes receiving key information of an external electronic device from the external electronic device processing at least one item of user data of the electronic device, generating temporary identification information based on at least one of the received key information of the external electronic device and key information of the electronic device, and transmitting the temporary identification information to the external electronic device.

The temporary identification information is generated based on at least one of key information of the electronic device, key information of the external electronic device, and time variant key information by using the time variant key information additionally.

The method of the electronic device further includes receiving additional information of the external electronic device from the external electronic device, determining to encrypt user data of the electronic device based on the received additional information of the external electronic device, and transmitting information related to the encryption of user data of the electronic device to the external electronic device.

The method further includes receiving user data of the electronic device obtained by the external electronic device from a server by using the temporary identification information.

The method of the electronic device further includes transmitting the generated temporary identification information to a server, moving the user data of the electronic device stored in a first database of the server to a second database of the server together with the temporary identification information, and transmitting the user data stored in the second database to an external electronic device based on the temporary identification information.

The method of the electronic device further includes controlling to transmit user data of the electronic device stored in a server to an account server corresponding to a user of the electronic device by using the generated temporary identification information.

Each block of the flowchart illustrations, and combinations of blocks in the flowchart illustrations herein, can be implemented by computer program instructions which can be provided to a processor of a general or special purpose computer, or other programmable data processing apparatus to produce a machine, such that the instructions, which are executed via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operations to be performed on the computer or other programmable apparatus to produce a computer implemented process such that the instructions that are executed on the computer or other programmable apparatus provide operations for implementing the functions specified in the flowchart block or blocks.

Each block of the flowchart illustrations may represent a module, segment, or portion of code, which comprises one or more executable instructions for implementing the specified logical function(s). It should also be noted that in some alternative implementations, the functions noted in the blocks may occur out of the listed order. For example, two blocks shown in succession may in fact be executed substantially concurrently, or may be executed in the reverse order, depending upon the functionality involved.

Certain aspects of the present disclosure can also be embodied as computer readable code on a non-transitory computer readable recording medium, which is any data storage device that can store data that can be thereafter read by a computer system. Examples of the non-transitory computer readable recording medium include a read only memory (ROM), a random access memory (RAM), compact disc-ROMs (CD-ROMs), magnetic tapes, floppy disks, and optical data storage devices. The non-transitory computer readable recording medium can also be distributed over network coupled computer systems so that the computer readable code is stored and executed in a distributed fashion. In addition, functional programs, code, and code segments for accomplishing the present disclosure can be easily construed by programmers skilled in the art to which the present disclosure pertains.

At this point it should be noted that the embodiments of the present disclosure as described above typically involve the processing of input data and the generation of output data to some extent. This input data processing and output data generation may be implemented in hardware or software in combination with hardware. For example, specific electronic components may be employed in a mobile device or similar or related circuitry for implementing the functions associated with the embodiments of the present disclosure as described above. Alternatively, one or more processors operating in accordance with stored instructions may implement the functions associated with the embodiments of the present disclosure as described above. If such is the case, it is within the scope of the present disclosure that such instructions may be stored on one or more non-transitory processor readable mediums such as a ROM, a RAM, CD-ROMs, magnetic tapes, floppy disks, and optical data storage devices. The processor readable mediums can also be distributed over network coupled computer systems so that the instructions are stored and executed in a distributed fashion. In addition, functional computer programs, instructions, and instruction segments for accomplishing the present disclosure can be easily construed by programmers skilled in the art to which the present disclosure pertains.

While the present disclosure has been illustrated and described with reference to embodiments thereof, it will be understood by those skilled in the art that various changes in form and details may be made therein without departing from the spirit and scope of the present disclosure as defined by the appended claims and their equivalents.

What is claimed is:
1. An electronic device comprising:
a communication module; and
a processor configured to:
receive, through the communication module, key information of an external electronic device from the external electronic device collecting and processing at least one item of user data of the electronic device, generate temporary identification information based on the received key information of the external electronic device and key information of the electronic device, transmit the generated temporary identification information to the external electronic device through the communication module, wherein the external electronic device combines the received temporary identification information with the processed at least one item of user data such that data generated by combining the generated temporary identification information and the processed at least one item of user data is transmitted from the external electronic device to a server, receive, in response to transmitting a request signal for transmitting the processed at least one item of the user data to the server with the generated temporary identification information, the at least one item of the user data corresponding to the generated temporary identification information from the server;

calculate a current location of the electronic device by using a sensor module of the electronic device; and determine to encrypt the user data of the electronic device based on the calculated current location of the electronic device.

2. The electronic device of claim 1, wherein the processor is further configured to generate the temporary identification information based on time variant key information.

3. The electronic device of claim 1, wherein the processor is further configured to receive additional information of the external electronic device from the external electronic device through the communication module and to determine to encrypt the user data of the electronic device based on the received additional information of the external electronic device.

4. The electronic device of claim 1, wherein the processor is further configured to transmit, through the communication module, information related to the encryption of user data of the electronic device to the external electronic device.

5. The electronic device of claim 1, wherein the processor is further configured to receive, through the communication module, user data of the electronic device obtained by the external electronic device from a server by using the generated temporary identification information.

6. The electronic device of claim 1, wherein the processor is further configured to transmit, through the communication module, a command for transmitting the user data of the electronic device stored in a server to an account server related to a user of the electronic device by using the generated temporary identification information.

7. The electronic device of claim 1, wherein the electronic device further comprises a memory and the processor is configured to transmit, through the communication module, the user data of the electronic device stored in the memory to the server together with the generated temporary identification information.

8. The electronic device of claim 1, wherein the processor is further configured to transmit a command for transmitting the generated temporary identification information to a first database of a server and move the user data of the electronic device stored in the first database to a second database of the server together with the temporary identification information.

9. The electronic device of claim 1, wherein the at least one item of the user data of the electronic device comprises biometric data, exercise data, and user information.

10. A method for operating an electronic device, the method comprising:

receiving key information of an external electronic device from the external electronic device collecting and processing at least one item of user data of the electronic device;

generating temporary identification information based on the received key information of the external electronic device and key information of the electronic device;

transmitting the temporary identification information to the external electronic device, wherein the external electronic device combines the received temporary identification information with the processed at least one item of user data such that data generated by combining the generated temporary identification information and the processed at least one item of user data is transmitted from the external electronic device to a server;

receiving, in response to transmitting a request signal for transmitting the processed at least one item of the user data to the server with the generated temporary identification information, the at least one item of the user data corresponding to the generated temporary identification information from the server, calculating a current location of the electronic device by using a sensor module of the electronic device; and determining to encrypt the user data of the electronic device based on the calculated current location of the electronic device.

11. The method of claim 10, wherein the temporary identification information is generated based time variant key information.

12. The method of claim 10, further comprising:
receiving additional information of the external electronic device from the external electronic device;
determining to encrypt user data of the electronic device based on the received additional information of the external electronic device; and
transmitting information related to the encryption of user data of the electronic device to the external electronic device.

13. The method of claim 10, further comprising:
receiving user data of the electronic device obtained by the external electronic device from a server by using the temporary identification information.

14. The method of claim 10, further comprising:
transmitting the generated temporary identification information to a server;
moving the user data of the electronic device stored in a first database of the server to a second database of the server together with the temporary identification information; and
transmitting the user data stored in the second database to the external electronic device based on the temporary identification information.

15. The method of claim 10, further comprising:
controlling to transmit user data of the electronic device stored in a server to an account server corresponding to a user of the electronic device by using the generated temporary identification information.

16. An electronic device comprising:
a communication module;
at least one sensor configured to collect data; and
a processor configured to:
transmit key information of the electronic device to an external electronic device through the communication module,
receive temporary identification information from the external electronic device through the communication module, the temporary identification information generated based on the key information of the electronic device and key information of the external electronic device, combine the received temporary identification information with data obtained by the at least one sensor;

transmit data generated by combining the received temporary identification information with the data obtained by the at least one sensor to a server through the communication module;

calculate a current location of the electronic device by using a sensor module of the electronic device; and determine to encrypt the user data of the electronic device based on the calculated current location of the electronic device.

17. The electronic device of claim 16, wherein the processor is further configured to receive information for encrypting data collected by the at least one sensor from the external electronic device through the communication module, and to encrypt the data collected by the at least one sensor based on the received information.

18. The electronic device of claim 16, wherein the processor is further configured to transmit the data to the server by using an address generated based on the temporary identification information.

* * * * *